United States Patent
Lerios et al.

(10) Patent No.: US 10,140,545 B2
(45) Date of Patent: *Nov. 27, 2018

(54) METHODS AND SYSTEMS FOR DIFFERENTIATING SYNTHETIC AND NON-SYNTHETIC IMAGES

(71) Applicant: Facebook, Inc., Menlo Park, CA (US)

(72) Inventors: Apostolos Lerios, Austin, TX (US);
Dirk Stoop, Palo Alto, CA (US); Ryan Mack, Waltham, MA (US); Lubomir Bourdev, Mountain View, CA (US);
Balmanohar Paluri, Menlo Park, CA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/376,589

(22) Filed: Dec. 12, 2016

(65) Prior Publication Data

US 2017/0091576 A1    Mar. 30, 2017

Related U.S. Application Data

(63) Continuation of application No. 15/004,656, filed on Jan. 22, 2016, now Pat. No. 9,558,422, which is a
(Continued)

(51) Int. Cl.
*G06K 9/36* (2006.01)
*G06K 9/46* (2006.01)
(Continued)

(52) U.S. Cl.
CPC ......... *G06K 9/4652* (2013.01); *G06K 9/4604* (2013.01); *G06K 9/4642* (2013.01);
(Continued)

(58) Field of Classification Search
CPC .. G06K 9/4652; G06K 9/4642; G06K 9/6202; G06K 9/6267; G06T 9/00;
(Continued)

(56) References Cited

U.S. PATENT DOCUMENTS

| | | | | |
|---|---|---|---|---|
| 6,125,201 A * | 9/2000 | Zador | ................ | H04N 19/63 |
| | | | | 375/E7.048 |
| 6,262,737 B1 * | 7/2001 | Li | ....................... | G06T 17/20 |
| | | | | 345/419 |
| 6,959,116 B2 * | 10/2005 | Sezer | ................. | G06T 9/005 |
| | | | | 375/240.03 |

(Continued)

OTHER PUBLICATIONS

Non-Final Office Action dated Mar. 25, 2016 for U.S. Appl. No. 15/004,656 of Lerios, A. et al. filed Jan. 22, 2016.
Notice of Allowance dated Nov. 3, 2015 for U.S. Appl. No. 14/526,190 of Lerios, A. et al. filed Oct. 28, 2014.
Notice of Allowance dated Sep. 12, 2016 for U.S. Appl. No. 15/004,656 of Lerios, A. et al. filed Jan. 22, 2016.
(Continued)

*Primary Examiner* — Amir Alavi
(74) *Attorney, Agent, or Firm* — Keller Jolley Preece

(57) ABSTRACT

The techniques introduced here include a system and method for transcoding multimedia content based on the results of content analysis. The determination of specific transcoding parameters, used for transcoding multimedia content, can be performed by utilizing the results of content analysis of the multimedia content. One of the results of the content analysis is the determination of image type of any images included in the multimedia content. The content analysis uses one or more of several techniques, including analyzing content metadata, examining colors of contiguous pixels in the content, using histogram analysis, using compression distortion analysis, analyzing image edges, or examining user provided inputs. Transcoding the multime-
(Continued)

dia content can include adapting the content to the constraints in delivery and display, processing and storage of user computing devices.

20 Claims, 17 Drawing Sheets

Related U.S. Application Data continuation of application No. 14/526,190, filed on Oct. 28, 2014, now Pat. No. 9,280,723, which is a continuation of application No. 13/781,632, filed on Feb. 28, 2013, now Pat. No. 8,903,186.

(51) Int. Cl.
*G06T 9/00* (2006.01)
*H04N 19/60* (2014.01)
*G06K 9/62* (2006.01)
*H04N 19/172* (2014.01)
*H04N 19/12* (2014.01)
*H04N 19/136* (2014.01)
*H04N 19/27* (2014.01)
*H04N 19/85* (2014.01)
*H04N 19/40* (2014.01)
*H04N 19/86* (2014.01)

(52) U.S. Cl.
CPC ......... *G06K 9/6202* (2013.01); *G06K 9/6267* (2013.01); *G06T 9/00* (2013.01); *H04N 19/12* (2014.11); *H04N 19/136* (2014.11); *H04N 19/172* (2014.11); *H04N 19/27* (2014.11); *H04N 19/40* (2014.11); *H04N 19/60* (2014.11); *H04N 19/85* (2014.11); *H04N 19/86* (2014.11)

(58) Field of Classification Search
CPC ..... G06T 9/005; G06T 2201/00; G06T 7/408; H04N 7/26; H04N 13/00
See application file for complete search history.

(56) References Cited

U.S. PATENT DOCUMENTS

| | | | | |
|---|---|---|---|---|
| 6,987,890 | B2 * | 1/2006 | Joshi | H04N 19/147 375/240.19 |
| 7,274,740 | B2 * | 9/2007 | van Beek | H04N 21/2365 375/240.02 |
| 7,352,298 | B2 * | 4/2008 | Monro | G06T 9/005 341/50 |
| 7,983,341 | B2 * | 7/2011 | Wang | H04N 19/56 375/240.12 |
| 8,223,837 | B2 * | 7/2012 | Sun | H04N 19/132 375/240.08 |
| 8,737,749 | B2 * | 5/2014 | Dai | G06K 9/3258 382/167 |
| 8,903,186 | B2 * | 12/2014 | Lerios | G06T 9/00 382/168 |
| 9,280,723 | B2 * | 3/2016 | Lerios | G06T 9/00 |
| 9,558,422 | B2 * | 1/2017 | Lerios | G06T 9/00 |
| 2004/0120589 | A1 * | 6/2004 | Lopresti | G06F 17/30253 382/239 |
| 2013/0148741 | A1 * | 6/2013 | Steinberg | H04N 19/40 375/240.25 |
| 2013/0321574 | A1 * | 12/2013 | Zhang | H04N 19/597 348/43 |
| 2014/0241629 | A1 | 8/2014 | Lerios et al. | |
| 2015/0110394 | A1 | 4/2015 | Lerios et al. | |
| 2016/0140415 | A1 | 5/2016 | Mack et al. | |

OTHER PUBLICATIONS

Notice of Allowance dated Sep. 25, 2014 for U.S. Appl. No. 13/781,632 of Lerios, A. et al. filed Feb. 28, 2013.
U.S. Appl. No. 13/781,632 by Lerios, A. et al. filed Feb. 28, 2013.
U.S. Appl. No. 14/526,190 of Lerios, A. et al. filed Oct. 28, 2014.
U.S. Appl. No. 15/004,656 of Lerios, A. et al. filed Jan. 22, 2016.

* cited by examiner

| Count | Final Image Type | User Input | Contiguous Pixel | Compression Distortion | Color Histogram | Edge Detection | Meta Data |
|---|---|---|---|---|---|---|---|
| 1 | Synthetic Image | S | S | N/A | N/A | N/A | N/A |
| 2 | Natural Image | N | N | N/A | N/A | N/A | N/A |
| 3 | Natural Image | S | N | N | N/A | N/A | N/A |
| 4 | Natural Image | S | N | S | N | N/A | N/A |
| 5 | Natural Image | S | N | S | S | N | N/A |
| 6 | Natural Image | S | N | S | S | S | N |
| 7 | Synthetic Image | S | N | S | S | S | S |
| 8 | Synthetic Image | N | S | S | N/A | N/A | N/A |
| 9 | Synthetic Image | N | S | N | S | N/A | N/A |
| 10 | Synthetic Image | N | S | N | N | S | N/A |
| 11 | Synthetic Image | N | S | N | N | N | S |
| 12 | Natural Image | N | S | N | N | N | N |

S = Synthetic Image Type
N = Natural Image Type
N/A = Result Ignored

*FIGURE 3A*

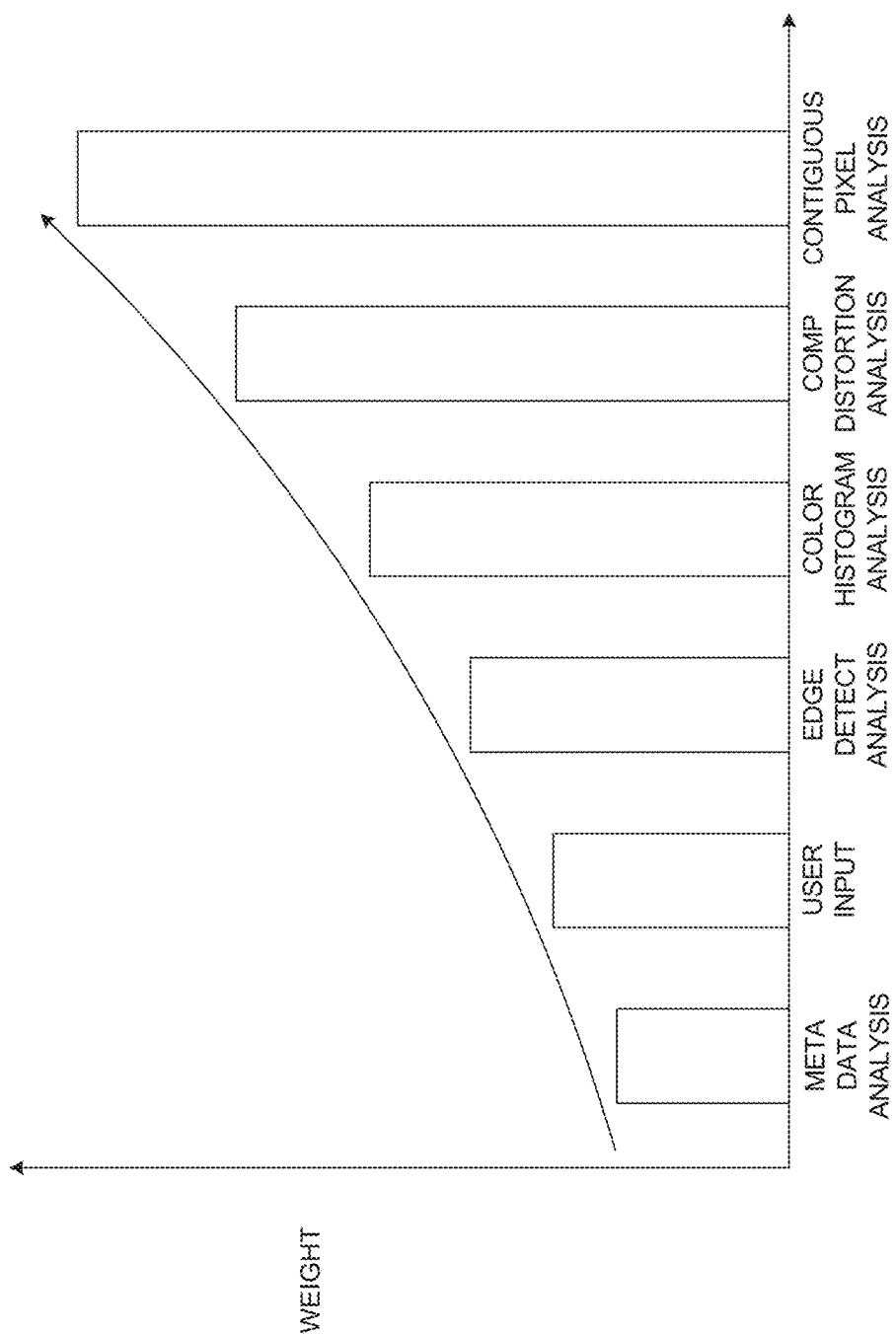

SYNTHETIC
IMAGE

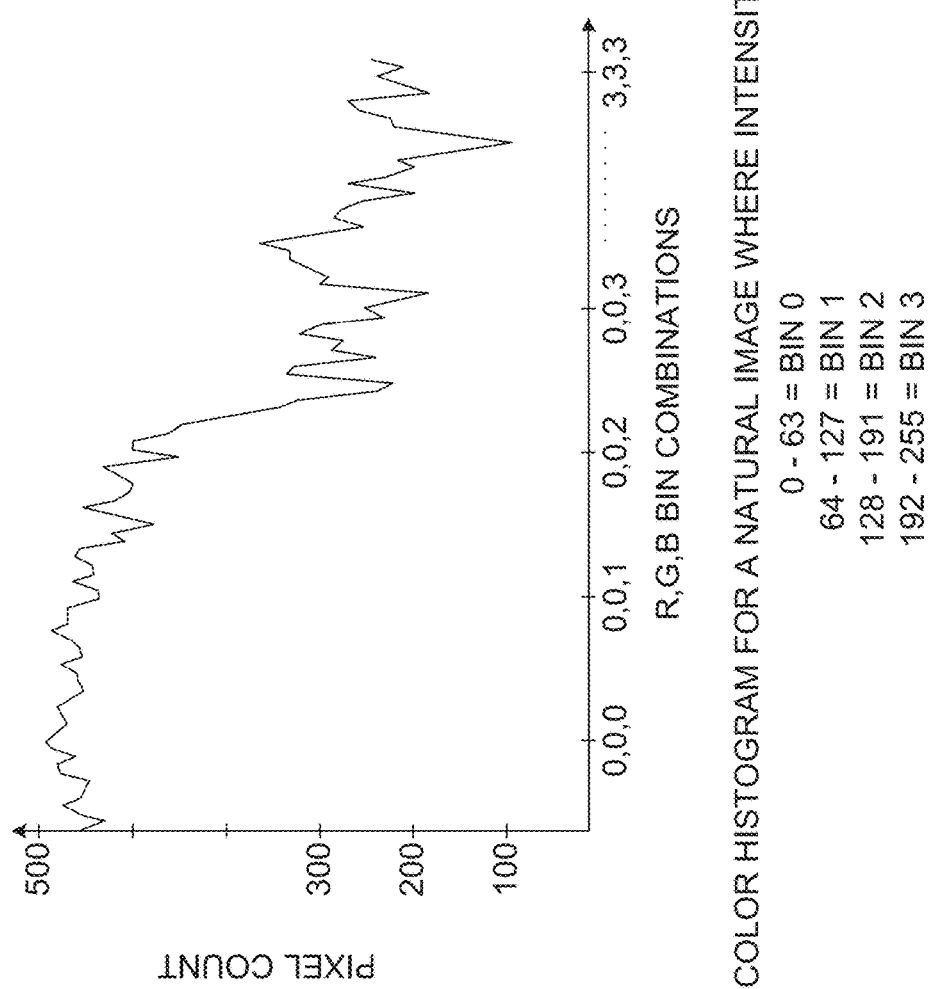

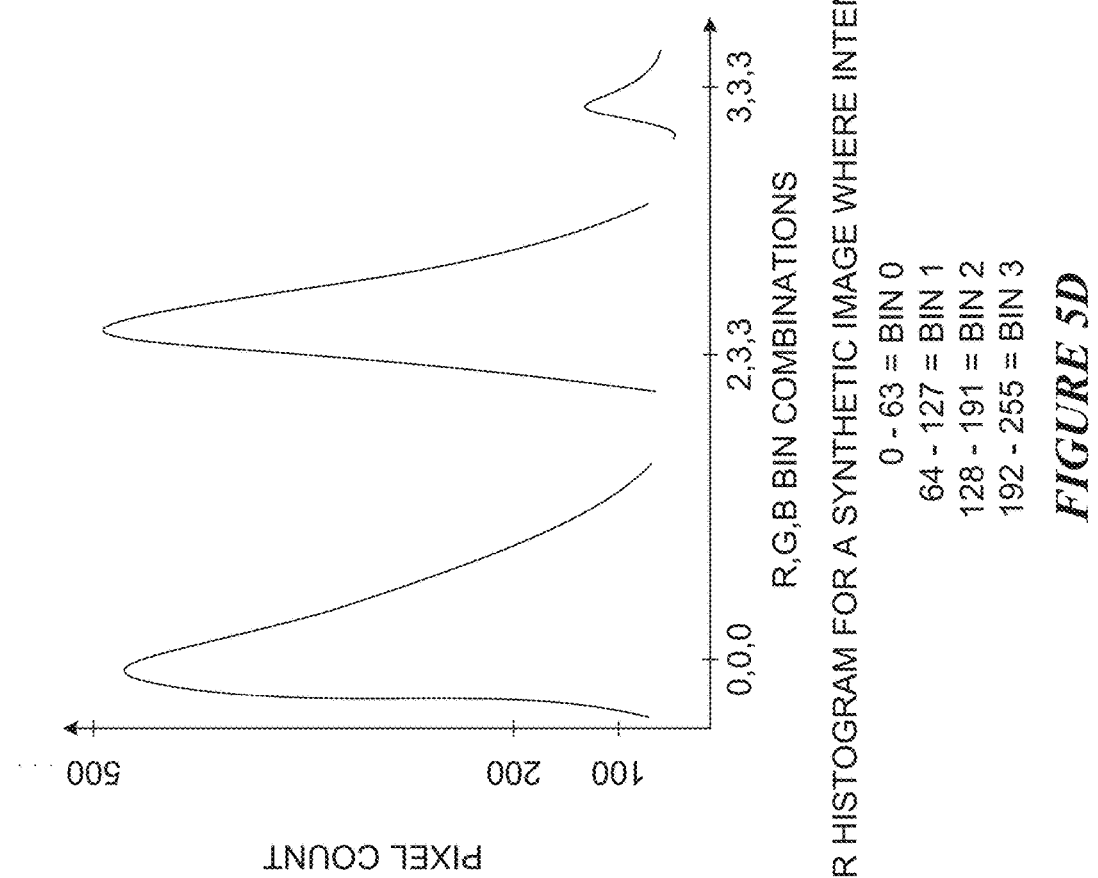

Examples of structural versus nonstructural distortions.

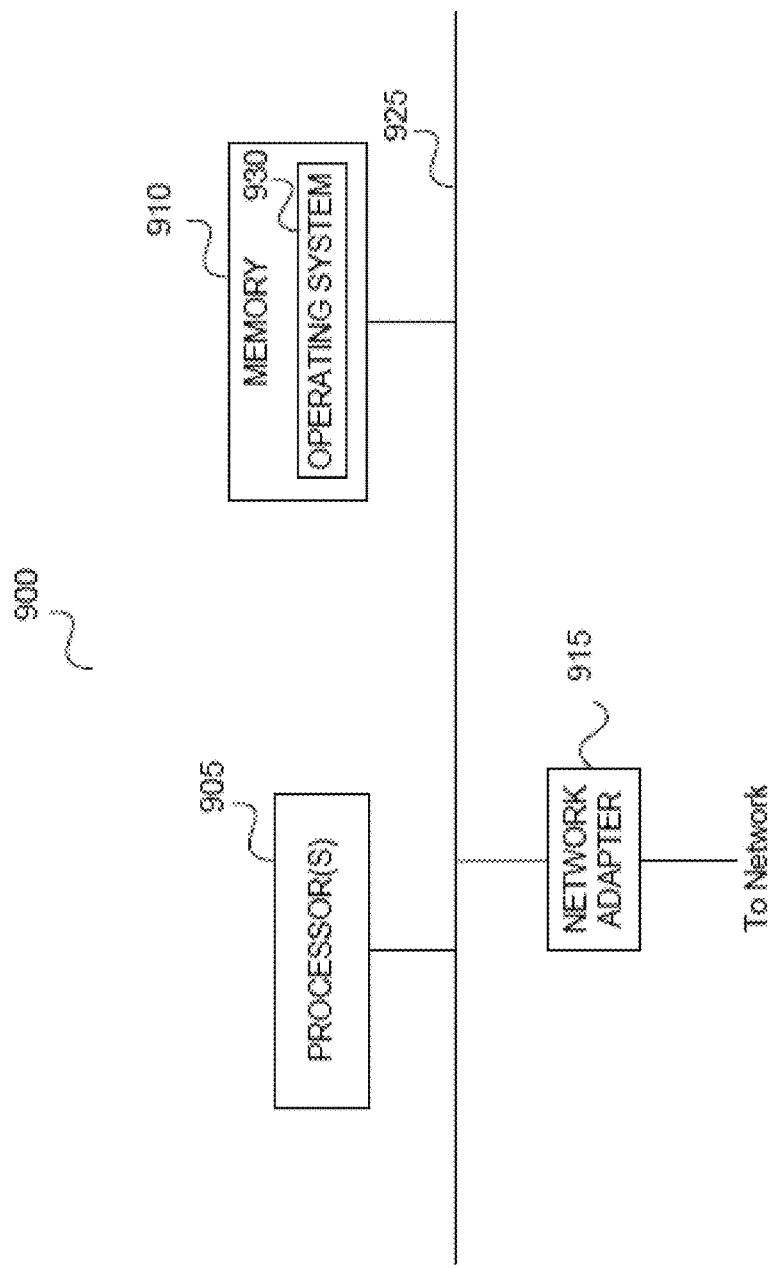

METHODS AND SYSTEMS FOR DIFFERENTIATING SYNTHETIC AND NON-SYNTHETIC IMAGES

CROSS-REFERENCED APPLICATIONS

This application is a continuation of U.S. patent application Ser. No. 15/004,656 entitled "METHODS AND SYSTEMS FOR DIFFERENTIATING SYNTHETIC AND NON-SYNTHETIC IMAGES," filed Jan. 22, 2016; which is a continuation of U.S. patent application Ser. No. 14/526,190 entitled "METHODS AND SYSTEMS FOR DIFFERENTIATING SYNTHETIC AND NON-SYNTHETIC IMAGES," filed Oct. 28, 2014 and issued on Mar. 8, 2016 as U.S. Pat. No. 9,280,723; which is a continuation of U.S. patent application Ser. No. 13/781,632 entitled "METHODS AND SYSTEMS FOR DIFFERENTIATING SYNTHETIC AND NON-SYNTHETIC IMAGES", filed Feb. 28, 2013 and issued on Dec. 2, 2014 as U.S. Pat. No. 8,903,186; all of which are expressly incorporated by reference in their entireties herein.

FIELD

This application generally relates to processing multimedia content and, more specifically, to systems and methods for analyzing multimedia content and transcoding the content based on the content analysis.

BACKGROUND

The internet and other network structures are widely used to distribute rich multimedia content using a variety of computing devices. However, the capabilities of the devices to access, process and display the content vary widely. Given the wide plethora of device types used in such communication, it is difficult for content publishers to anticipate and accommodate the different capabilities of receiving devices. In one known method, multiple versions of the content are generated from a primary version of the content, and one of the versions is selected for transmission to a given device based on the perceived capabilities of the given device. In some instances, the primary version is transcoded or otherwise manipulated based on constraints in display, processing, storage, and other such parameters of client devices targeted for receiving the content. Known transcoding schemes utilize various data compression and media conversion schemes to convert the primary content based on a receiving device's constraints. However, these schemes do not effectively account for inherent characteristics of the primary content.

SUMMARY OF THE DESCRIPTION

Embodiments described herein are directed toward systems and methods for analyzing inherent characteristics of multimedia content and further transcoding the content based on the content analysis. In embodiments, determination of specific transcoding parameters, used for transcoding multimedia content, is based, at least in part, on results of analysis of the inherent characteristics of the multimedia content. In one scenario, the content is analyzed based on a determination of an image type (e.g., a synthetic vs. a natural image) of any images included in the multimedia content. The content analysis uses one or a combination of two or more of a variety of techniques. Such techniques include, for example, analyzing metadata associated with the content, examining colors of contiguous pixels in the content, analyzing color and other characteristic histograms extracted from the content, using compression distortion analysis to identify distortion in images before and after compression-decompression processing, analyzing image edges, examining user provided inputs, etc. In embodiments, specific parameters for transcoding the multimedia content are then identified, based at least in part on the image type determined as a result of the content analysis.

This Summary is provided to introduce a selection of concepts in a simplified form that are further described in the Detailed Description and drawings. This Summary is not intended to identify essential features of the claimed subject matter or to limit the scope of the claimed subject matter.

BRIEF DESCRIPTION OF THE DRAWINGS

The techniques introduced here may be better understood by referring to the following Detailed Description in conjunction with the accompanying drawings, in which like reference numerals indicate identical or functionally similar elements:

FIG. 3A illustrates a decision table used by the computation subsystem to determine image type of a given image based on the results of content analysis;

FIG. 3B illustrates the weights of various content analysis processes in the decision table;

FIG. 5C illustrates the results of histogram analysis on the natural image in FIG. 5A;

FIG. 5D illustrates the results of histogram analysis on the synthetic image in FIG. 5B;

FIG. 9 is a high-level block diagram showing an example of the architecture for a computer system.

DETAILED DESCRIPTION

A method and system for analyzing multimedia content and transcoding the content based on the results of the analysis is presented. The transcoding adapts the content to constraints in storage, delivery, and display. Note that references in this specification to "an embodiment," "one embodiment," or the like mean that the particular feature, structure, or characteristic being described is included in at least one embodiment of the present invention. Occurrences of such phrases in this specification do not necessarily all refer to the same embodiment.

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

Figure 1:
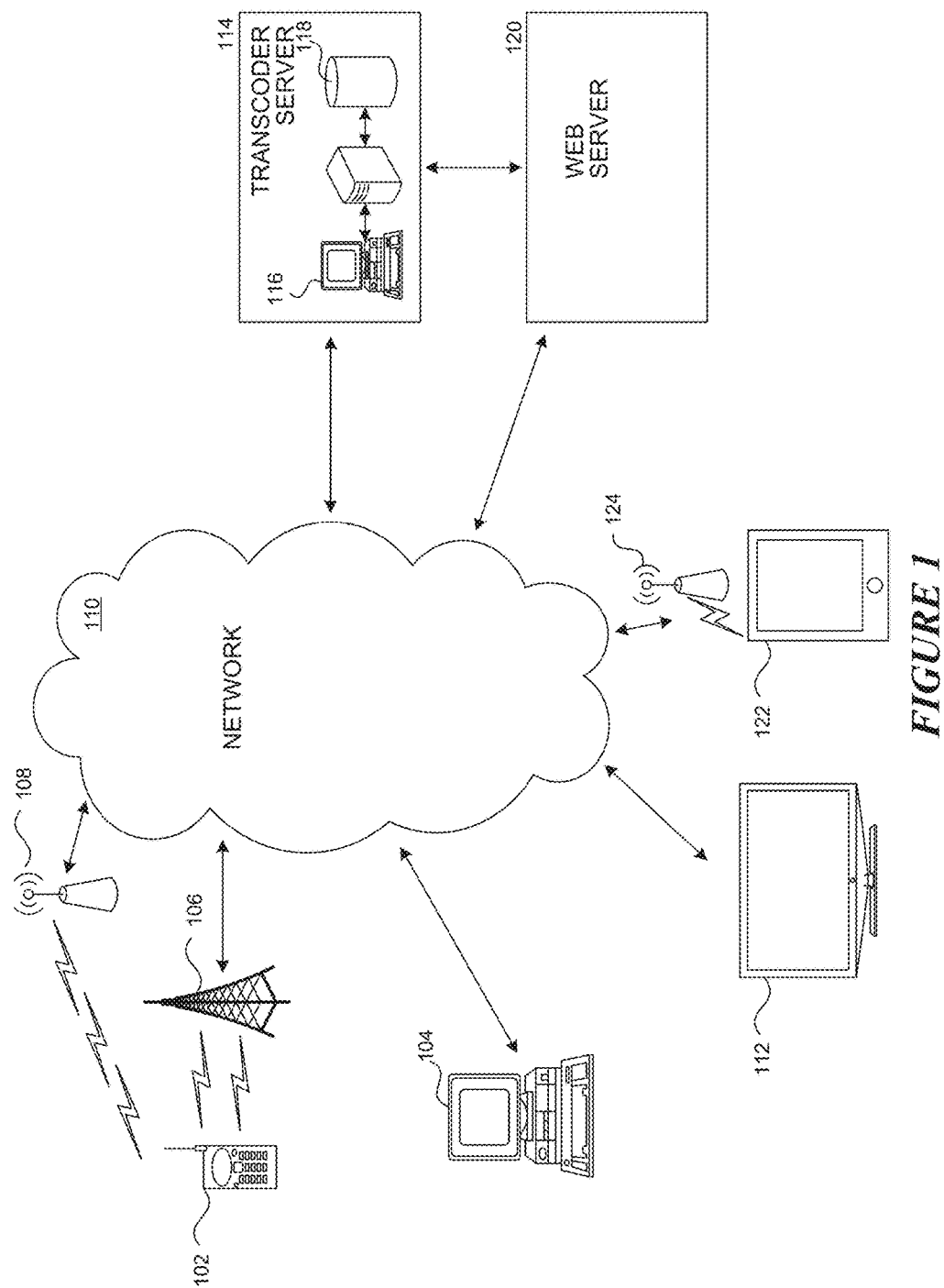
FIG. 1 and the following discussion provide a brief, general description of a representative environment in which the invention can be implemented.

FIG. 1 and the following discussion provide a brief, general description of a representative client-server environment in which the invention can be implemented. Although not required, aspects of the invention may be described below in the general context of computer-executable instructions, such as routines executed by a general-purpose data processing device (e.g., a server computer or a personal computer). Those skilled in the relevant art will appreciate that the invention can be practiced with other communications, data processing, or computer system configurations, including: wireless devices, Internet appliances, hand-held devices (including smart-phones and personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "server," and the like are used interchangeably herein, and may refer to any of the above devices and systems.

While aspects of the invention, such as certain functions, are described as being performed exclusively on a single device, the invention can also be practiced in distributed environments where functions or modules are shared among disparate processing devices. The disparate processing devices are linked through a communications network, such as a Local Area Network (LAN), Wide Area Network (WAN), or the Internet. In a distributed computing environment, program modules may be located in both local and remote memory storage devices.

Aspects of the invention may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data related to the invention may be distributed over the Internet or over other networks (including wireless networks), on a propagated signal on a propagation medium (e.g., an electromagnetic wave(s), a sound wave, etc.) over a period of time. In some implementations, the data may be provided on any analog or digital network (packet switched, circuit switched, or other scheme).

As shown in FIG. 1, a client/user may use a personal computing device (e.g., a phone 102, a personal computer 104, a tablet 122, etc.) or a smart television 112 (e.g. a Sharp Aquos®), to communicate with a network. The term "phone," as used herein, may be a cell phone, a personal digital assistant (PDA), a portable email device (e.g., an iPhone®, a Blackberry®), a tablet device (e.g., an iPad®), a portable media player (e.g., an iPod Touch®), or any other device having communication capability to connect to the network. In one example, the phone 102 connects using one or more cellular transceivers or base station antennas 106 (in cellular implementations), access points, terminal adapters, routers or modems 108 (in IP-based telecommunications implementations), or combinations of the foregoing (in converged network embodiments).

In some instances, the network 110 is the Internet, allowing the phone 102 (with, for example, WiFi capability), the personal computer 104, the tablet 122, or the smart television 112, to access web content offered through various web servers. In some instances, especially where the phone 102 or tablet 112 is used to access web content through the network 110 (e.g., when a 3G or an LTE service of the phone 102 is used to connect to the network 110), the network 110 may be any type of cellular, IP-based or converged telecommunications network, including but not limited to Global System for Mobile Communications (GSM), Time Division Multiple Access (TDMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), Worldwide Interoperability for Microwave Access (WiMAX), Universal Mobile Telecommunications System (UMTS), Evolution-Data Optimized (EVDO), Long Term Evolution (LTE), Ultra Mobile Broadband (UMB), Voice over Internet Protocol (VoIP), Unlicensed Mobile Access (UMA), etc.

In some instances, a user uses one of the personal computing devices (e.g., the phone 102, the personal computer 104, the tablet 122, etc.) or the smart television 112, to connect to a multimedia content server 114 through the network 110. In one embodiment, the multimedia content server 114 comprises a server computer 116 coupled to a local database 118. The term "multimedia content server" as indicated herein, refers to a server station or other computing apparatus capable of hosting a web service that is accessible by other computing systems (e.g., the personal computer 104) through, for example, the Internet.

In one embodiment, a client uses the personal computing devices to make a request for content from the multimedia content server 114. The request is communicated through the network 110. The multimedia content server 114 retrieves the requested content from a local database 118 and delivers the requested content back to the client's computing device in a form that is suitable for the display and processing constraints of the client computing device. The multimedia content server 114 performs the task by analyzing the content requested by the client and transcoding the requested content in order to adapt the content to the constraints of the client's personal computing device (e.g. the tablet 122).

Figure 2A:
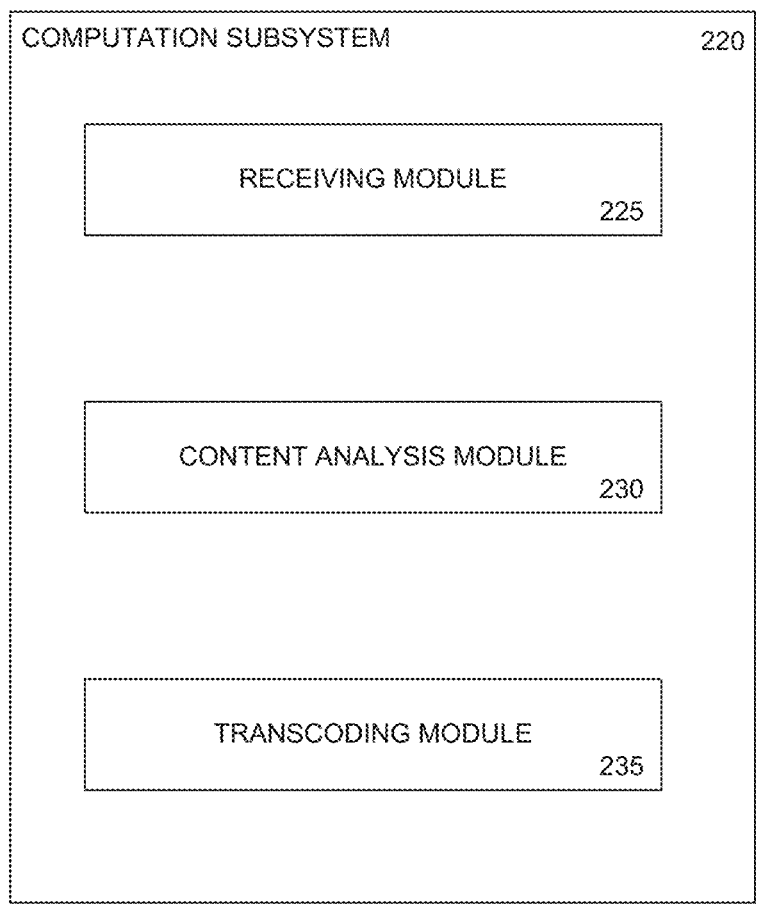
FIG. 2A is a block diagram illustrating a computation subsystem included in a multimedia content server.

Now refer to FIG. 2A, which provides an exemplary architecture of the multimedia content server 114. In the illustrated embodiment, the multimedia content server 114 includes a computation subsystem 220, which performs various functions related to the content analysis and transcoding process. The computation subsystem 220 can be implemented by using programmable circuitry programmed by software and/or firmware, or by using special-purpose hardwired circuitry, or by using a combination of such embodiments. In some instances, the computation subsystem 220 is implemented as a unit in a processor of the multimedia content server.

The computation subsystem 220 includes a receiving module 225 that, in some instances, is configured to communicate with external interfaces to receive a user input from the user. In one example, the user uses a personal computing device to open a website offering multimedia storage service. The web server operating the service receives any requests sent by the user (e.g., selection of an option to upload an image etc.) and transmits it to the receiving module 210 of the multimedia content server 114. The receiving module, in some instances, receives the user's requests and processes the requests for further processing by the multimedia content server 114.

The computation subsystem 220 also includes a content analysis module 230 to determine characteristics of the requested content. The content analysis module performs a variety of operations including, but not limited to, classifying images into an image type, splitting multimedia content into multimedia objects, and further splitting multimedia objects into constituent types. The computation subsystem 220 further includes a transcoding module 235. In embodiments, the transcoding module utilizes the results of the content analysis and adapts the content according to the processing, delivery and display constraints of the client's device. For example, consider a situation where the user's computer, or an application in the user's computer, is capable of displaying images only in JPEG format. When an image to be transmitted to the computer is in an uncompressed format (e.g., a PNG format) as indicated by the content analysis module, the transcoding module then processes the image to convert it to the JPEG format.

In one instance, the transcoding module utilizes transcoding parameters when adapting (or converting format of) the content according to the constraints of the client's device, where transcoding parameters are based on the image type of the content. For example, the transcoding parameters could be set such that the transcoding module compresses natural images (e.g., photographs, scanned copies of photographs, any picture taken with a camera, etc.) and synthetic images (e.g., CGI images) differently. As explained in further detail below, the transcoding module may perform operations such as compressing the images, converting image from one format to another and so forth based on whether the images are natural or synthetic. Once the transcoding is performed, the content is returned to the client's computing device through the network 110. As will be apparent to one having skill in the relevant art, the foregoing modules in the computation subsystem are representative and may be combined or broken up into further modules provided that the functionality remains.

In embodiments, a user uses a personal computing device to upload content into the multimedia content server 114 through the network 110. Upon receiving the uploaded content, the multimedia content server 114 stores the received content in, for example, local database 118. The multimedia content server 114 utilizes the content analysis module and the transcoding module to analyze the received content and transcode the content into different adaptations. The various content adaptations are based on anticipated client devices that might request the uploaded content and the delivery network (e.g., wireless mobile network vs. WLAN network) the content will be requested through. In embodiments, the various transcoded content adaptations are stored along with the received content in the local database 118.

In some instances, the content analysis module determines the image type of the received content and stores the image type along with the received image in the local database 118. For example, the content analysis module determines whether the image is a synthetic or natural image and stores that information, for example, as metadata associated with the stored images. When a request is received to download the stored image, the transcoding module 235 utilizes the image type (e.g., stored as metadata with the image) to determine appropriate transcoding parameters for transcoding the content. In embodiments, the transcoding module (or other modules of the multimedia content server) may receive an indication of constraints associated with the requesting client. Examples of such constraints may include display resolution, network bandwidth associated with the client's request, user's preferences, etc. In embodiments, the transcoding module may utilize these constraints to further determine appropriate parameters for the transcoding process.

For purpose of further illustration, it is useful to consider the techniques explained herein as it applies to content analysis for transcoding purposes in general. Of course, however, it should be noted that the techniques introduced here extend to other purposes. For example, the techniques introduced here to distinguish a natural image from a synthetic image can be useful in other applications, such as running facial recognition when the image is classified as a natural image (where the natural image is likely to contain human faces than synthetic images), determining the photo editing tools to provide a user based on the type of the image being edited by the user (e.g. providing a red eye reduction tool when the image is classified as a natural image), etc.

Figure 2B:
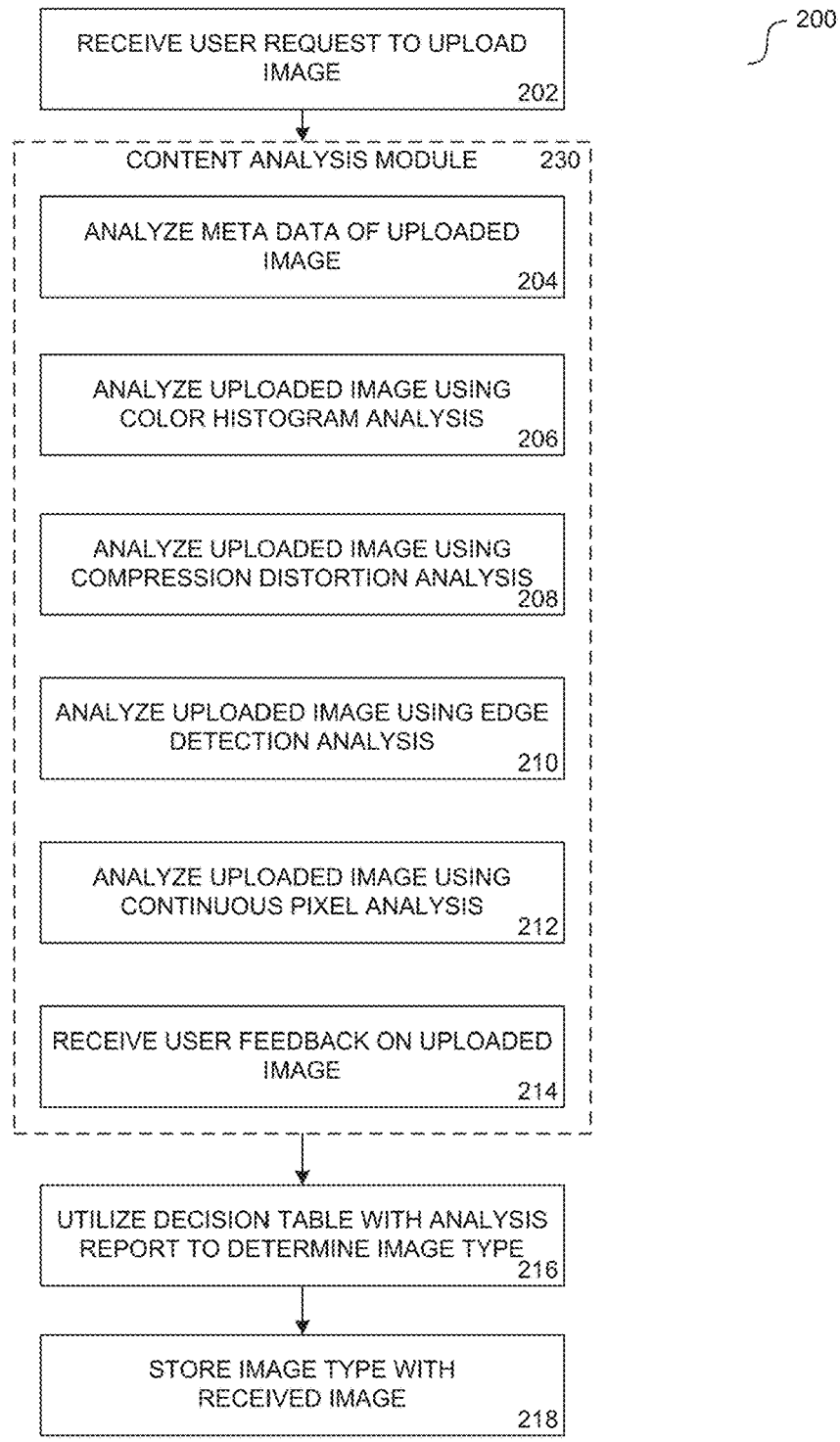
FIG. 2B is a flowchart illustrating content analysis and transcoding process performed by the computation subsystem included in the multimedia content server.

FIG. 2B now illustrates a flow diagram 200 of a process that includes multimedia content analysis and transcoding. Upon receiving a client request to upload content, the process starts with the multimedia content server 114 receiving the uploaded content in step 202. The server (e.g., a content analysis module 230 of the server) then analyzes the received content determine an image type for the received content (e.g., whether the image is a natural or a synthetic image). As discussed in the following paragraph (and as illustrated in step 220), the content analysis may include one or more types of analysis routines to determine this image type. The following description of FIG. 2B provides an introduction to the various analysis routines. In addition to this introduction, these analysis routines are explained in further detail in subsequent sections of this Specification.

Further, as is discussed in further detail below (e.g., in reference to FIGS. 3A, 3B, and 4), in embodiments, the results from the content analysis process may be utilized in conjunction with a decision tree to determine image type for received content.

The content analysis process may include on or more types of analysis routines, as illustrated in step 220. In some instances, a metadata analysis routine 204 analyzes the received content to determine the image type of the content based on any metadata associated with the received image. Metadata associated with multimedia content can include data such as date and time of creation of content, manufacturer of any device used to create content, any software utilized to modify the content, etc.

Another type of analysis routine is a histogram analysis routine 206. Using this routine, the nature of distribution of pixel colors in the image content (e.g. a photograph) across the color histogram to determine the image type of the content.

Another routine, a compression distortion analysis routine 208 determines the image type of the content by measuring a degree of distortion between an original image and a processed version of the image. In some instances, the process generates a processed version of the image by compressing the image and subsequently decompressing the compressed image. Distortion is measured between the original content and the "processed" version of the image and a measure of this distortion is indicative of image type of the received image.

Another routine, an edge detection analysis routine 210, utilizes geometry of edges (e.g. a straight line edge) of one or more objects in the image content to determine an image type for the received content. For a given image, presence of geometric shapes (e.g., a straight line or boxes) is indicative of the image being synthetic.

A contiguous pixel analysis routine 212 utilizes presence of contiguous pixels of similar color in the received content to determine the content's image type. For a given image, presence of contiguous pixels is likely to be indicative of the image being a synthetic image.

Other exemplary routines may include a user voluntarily (or upon request) providing information about the type of the image. It is understood that any one of these routines or a combination that uses two or more of these routines may be utilized for efficient and accurate determination of image type of the received image.

Further, in some embodiments, the process may utilize a decision tree (e.g., the decision trees illustrated in FIGS. 3A, 3B, and 4) to process results from one or more of the above routine to determine the image type of the received image.

In embodiments, the process may utilize, for example, a decision table or similar process (as discussed in detail with reference to FIGS. 3A and 3B below), to weigh the results of the various content analysis routines to determine a final image type for the received content. It should be noted that, in some embodiments, the process could simply utilize a combination of one or more of the content analysis routines to determine the final image type and thus not require a decision table or other similar process to determine a final image type of the content. The process, in step 218, then tags or otherwise stores the final image type in conjunction with the received image In embodiments, the process may further include a transcoding routine (step 220) for transcoding content into various content formats based on the determined final image type and stores the transcoded content in the local database 118. When responding to a client request for the stored content, the multimedia content server 114 can retrieve the stored original content and the various associated content and serve the client with the content in the image format that best suits the client's device and delivery constraints. The process of transcoding content based on the image type is further explained in detail in later sections of this Specification.

FIG. 3A provides an illustrative example of a decision table to weigh the results of the various content analysis routines (e.g., the routines discussed in step 220 of FIG. 2) to determine the final image type of the content. In illustrative scenarios, the final image type of the content maybe an indication that the content is a synthetic image or a natural image. It should be noted that the image types have been kept to just two types in FIG. 3A to simplify the illustrative decision table and that one of ordinary skill in the art would realize that the image types can be expanded to include additional categories such as, for example, color images, black-and-white images, gray images, color natural images, black-and-white natural images, gray natural images, simple graphics, complex graphics, gray graphics, etc. and the decision table expanded to include the finer image types.

The decision table in FIG. 3A helps the process of weighing the results of each of the content analysis routines to determine the final image type.

As illustrated in FIG. 3A, the combination of content analysis results and the respective final image type of the content for each such result combination is provided. In arriving at the final image type for each combination, the result of each content analysis process is given a different weight and results of the different content analysis routines are combined to determine the final image type. For example, as illustrated in FIG. 3B, the contiguous pixel analysis routine is given the highest weight and the metadata analysis routine the lowest weight. The remaining routines, such as the compression distortion analysis routine and the edge detection routine, are given weights lower than that of the contiguous pixel analysis but weights higher than that of metadata analysis.

In FIG. 3A, for count 1, the final image type is a synthetic image, where the user input and the contiguous pixel analysis both indicate that the image type is synthetic. Given that contiguous pixel analysis has the highest weight and that the user input matches the result of the contiguous pixel analysis, the final image type is determined to be synthetic with a high confidence value, allowing the results of the other content analysis routines to be ignored. On the other hand, in count 3, when the image type determined by the contiguous pixel analysis and that provided by the user do not match, the results of the compression distortion analysis, the process with the next highest weight, is used to determine the final image type. In count 3, when the contiguous pixel analysis and compression distortion analysis results agree that the image type is a synthetic image, the final image type of the content is determined to be synthetic.

In FIG. 3A, for count 4, when the image type determined by the contiguous pixel analysis and that determined by the compression distortion analysis do not match, the results of the color histogram analysis, the process with the next highest weight, is used to determine the final image type. When the contiguous pixel analysis and color histogram analysis results agree that the image type is a synthetic image, the final image type of the content is set to a synthetic image. However, when the compression distortion analysis and color histogram analysis determine the image type to be a natural image but the contiguous pixel analysis determines the image type to be a synthetic image, the results of the edge detection analysis, the process with the next highest weight, is used to determine the final image type. Given that contiguous pixel analysis has a higher weight compared to both compression distortion analysis and color histogram analysis, the matching result of the compression distortion analysis and color histogram analysis is not sufficient to determine the final image type. The color histogram analysis is used to further ensure that the determined final image type is accurate. The decision table includes metadata analysis results which are further used to refine the final image type of the content as described above.

Figure 4:
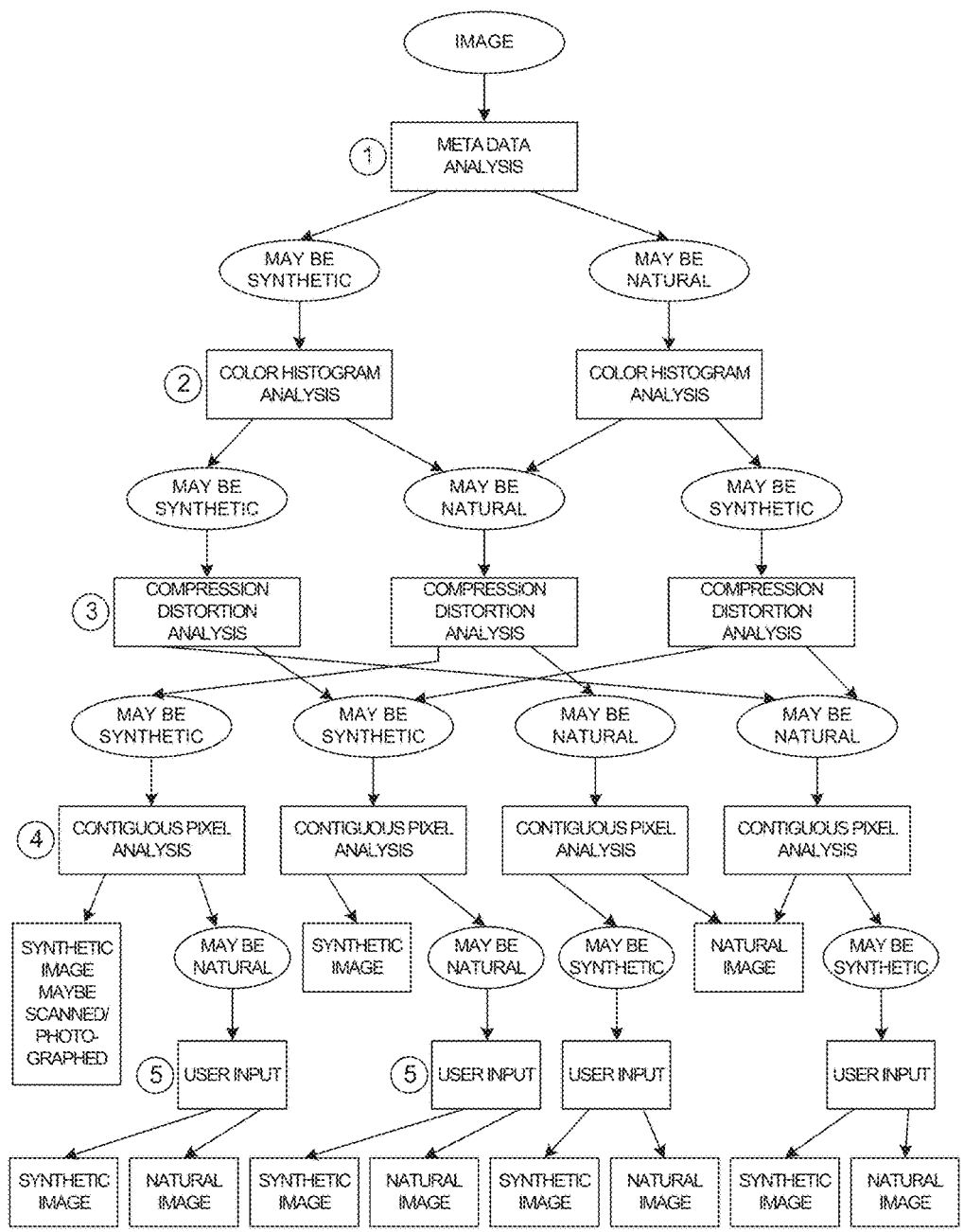
FIG. 4 illustrates a decision tree used by the computation subsystem to determine image type of a given image based on the results of content analysis.

FIG. 4 provides an illustrative example of a decision tree that may also be used weigh the results of the various content analysis routines. In embodiments, the decision tree in FIG. 4 weighs results of each of the content analysis routines to determine the final image type. It should be noted that other decision trees could be generated based on different combinations of the content analysis routines. In step 1, the metadata analysis routine is indicates an image type value. Based on the metadata analysis routine, the process may preliminarily set the final image type to be synthetic or natural and continues to traverse the decision tree. In step 2, the process utilizes the image type determined by the color histogram analysis routine to traverse the decision tree. Similarly, in steps 3, 4, and 5, the process utilizes the image type determined by the compression distortion analysis, the continuous pixel analysis, the user provided input, respectively, to traverse the decision tree to determine a final image type for the received multimedia content.

Description of Content Analysis Routines

The following sections now provide further description of the various content analysis routines introduced above.

Metadata Analysis Routine

The metadata analysis utilizes any metadata associated with the received image to determine an image type for the received content. Metadata associated with the content can include information associated with the content stored using Exchangeable Image File format ("EXIF"). EXIF is a standard that specifies the formats for images, sound, and ancillary tags used by digital cameras (including smartphones), scanners and other systems handling image and sound files recorded by digital cameras.

For example, table 1 shows some of the EXIF metadata for a photograph shot using a typical digital camera.

TABLE 1

| Tag | Value |
| --- | --- |
| Manufacturer | Olympus |
| Model | QV-4000 |
| Orientation (rotation) | top-left [8 possible values] |
| Software | Ver1.01 |
| Date and Time | 2003:08:11 16:45:32 |
| YCbCr Positioning | centered |
| Compression | JPEG compression |
| x-Resolution | 72.00 |
| y-Resolution | 72.00 |
| Resolution Unit | Inch |
| Exposure Time | 1/659 sec. |

The metadata analysis utilizes the EXIF metadata information such as the manufacturer of a device utilized to capture the image, the model of the device, the software associated with the device, a date and a time of capture of the image, any type of compression of the image, software associated with the creation of the image, etc. to determine the image type. For example, if the EXIF metadata associated with the content shows that the content was taken using an Olympus camera, it is highly likely that the content is a photograph i.e. a natural image. Similarly, if the manufacturer metadata shows that the device used to create the content is a scanner, then the content could either be a photograph or a graphically rendered image. In such a case, the content analysis process would require further analysis of other metadata and even other content analysis processes to accurately determine the image type of the content. The metadata analysis could utilize any software information associated with the content to further improve the image type determination. For example, if the EXIF metadata shows that the content was further edited using Photoshop Lightroom, a photo editing tool, then it is highly likely that the content is a photograph that has been further edited by the client.

Color Histogram Analysis

The color histogram analysis utilizes the nature of distribution of pixel colors in the multimedia content (e.g. a photograph) across a color histogram to determine the image type of the content. A color histogram is a representation of the distribution of colors in an image. For digital images, a color histogram represents the number of pixels that have colors in each of a fixed list of color ranges that span the image's color space, the set of all possible colors. The color histogram can be built for any kind of color space, although the term is more often used for three-dimensional spaces like RGB or HSV. For monochromatic images, the term intensity histogram may be used instead.

A color histogram of an image is produced by first discretization of the colors in the image into a number of bins, and counting the number of image pixels in each bin. For example, a Red-Blue chromaticity histogram can be formed by first normalizing color pixel values by dividing RGB values by R+G+B, then quantizing the normalized R and B coordinates into N bins each. A two-dimensional histogram of Red-Blue chromaticity divided into four bins (N=4) could yield a histogram showing pixel distribution that looks like the below table 2:

TABLE 2

| | | red | | | |
| --- | --- | --- | --- | --- | --- |
| | | 0-63 | 64-127 | 128-191 | 192-255 |
| blue | 0-63 | 43 | 78 | 18 | 0 |
| | 64-127 | 45 | 67 | 33 | 2 |
| | 128-191 | 127 | 58 | 25 | 8 |
| | 192-255 | 140 | 47 | 47 | 13 |

A three-dimensional RGB color histogram for the above example could be thought of as four separate Red-Blue histograms, where each of the four histograms contains the Red-Blue values for a bin of green (0-63, 64-127, 128-191, and 192-255).

The color histogram analysis utilizes the nature of distribution of pixel colors in the multimedia content (e.g. a photograph) across a color histogram to determine the image type of the content. For a synthetic image (e.g. graphically rendered image), the image is likely to contain a limited range of colors compared to colors that can be found in a natural image (e.g. a photograph). Further, the limited range of colors found in the synthetic image are likely to be grouped and distributed in a periodic manner unlike the distribution in the natural image, where the distribution is like to be very noisy. A threshold for periodicity can be established to identify an image as synthetic when the distribution of pixel colors in a histogram is greater than the established threshold. In one instance, the threshold can be empirically established by analyzing a large sample of natural and synthetic images and setting the threshold at the point that result in the least number of false-positives in the determination of image type. In addition, given that a synthetic image is likely to contain a limited range of colors, the distribution of pixel colors in the synthetic image's histogram is also likely to have discrete gaps in the distribution. Such discrete gaps are less likely in a natural image, such as a photograph, because of the wider range of colors generally found in the natural images and the unique effect of lighting and other natural elements affecting the color of each and every pixel in the image.

Figure 5A:
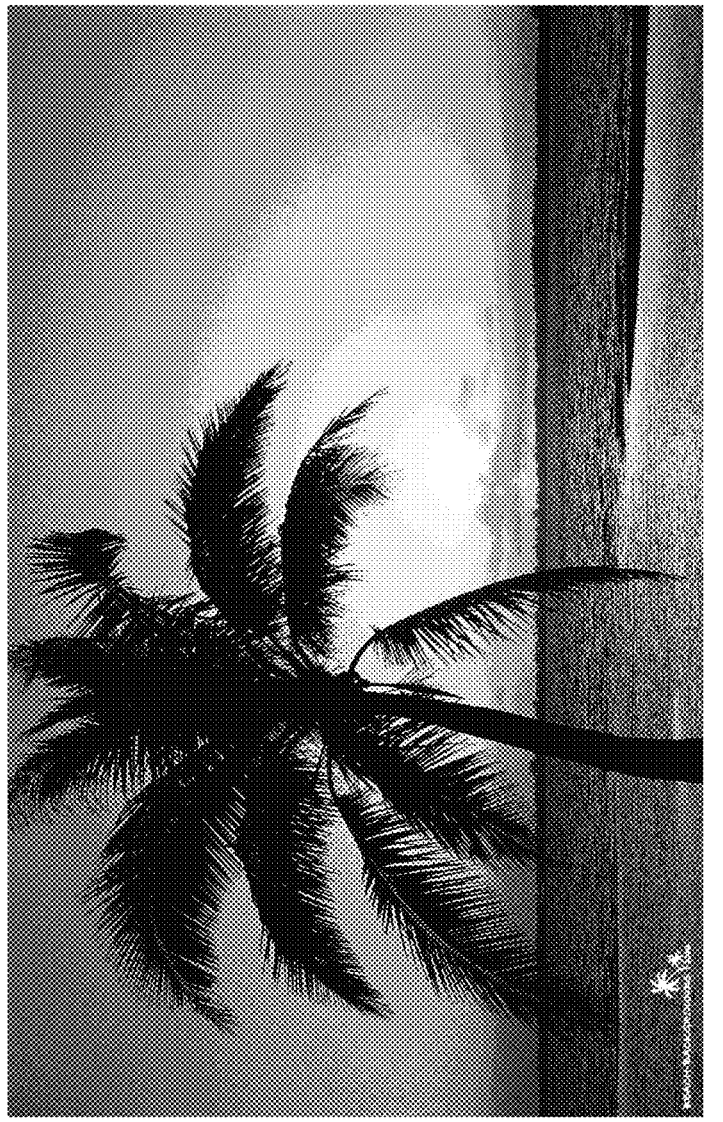
FIG. 5A depicts an exemplary natural image.
Figure 5B:
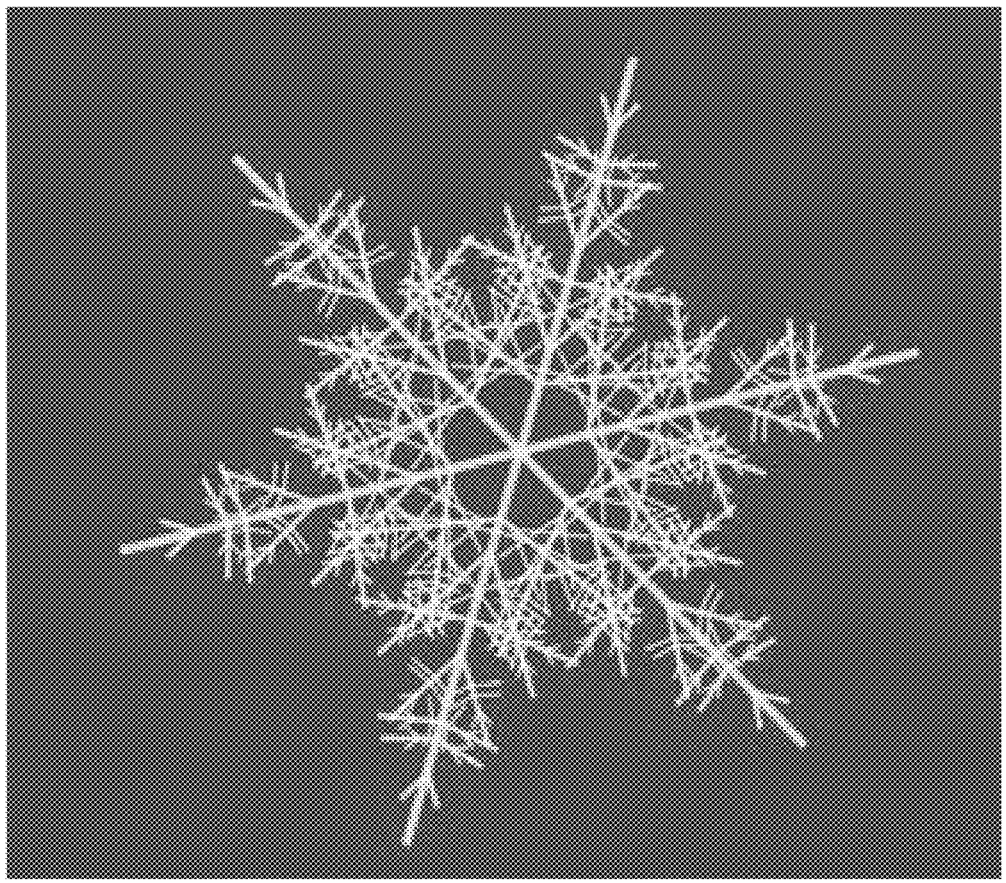
FIG. 5B depicts an exemplary synthetic image.

FIGS. 5A, 5B, 5C and 5D provide an illustrative example of natural and synthetic images and their respective color histograms that help determine the image type of each of the associated images. FIG. 5A is a photograph of a sunset representing a natural image while FIG. 5B is a graphically rendered image representing a synthetic image. As it can be seen in FIG. 5A, there are a wide range of objects in the image with each object composed of varying colors. Further, the image illustrates how a given color of a given intensity is simply not replicated across the image. Instead, each pixel's color, even if closely similar to that of the color of the adjacent pixel, is perceptibly different due to the effect of the lighting and other natural elements. This distribution of colors in the photograph can be further seen in detail in the associated RGB histogram shown in FIG. 5C. As expected, the nature of distribution of the pixel colors across the histogram is random and noisy. Further, given the wide range of colors found in photograph, the distribution of the pixel colors also spans across the histogram without a substantial break (i.e. missing pixel colors of certain RGB range) in the distribution curve.

FIG. 5B is a graphically rendered image representing a synthetic image. As it can be seen in FIG. 5B, there are a limited number of identifiable objects in the image with each object composed of a limited range of colors. Further, the image illustrates how a given color of a given intensity is replicated across the image. This distribution of colors in the photograph can be further seen in detail in the associated RGB histogram shown in FIG. 5D. As expected, the nature of distribution of the pixel colors across the histogram is more periodic and less noisy. Further, given the limited range of colors found in the graphics, the distribution of the pixel colors also spans across the histogram with breaks (i.e. missing pixel colors of certain RGB range) in the distribution curve.

By utilizing the nature of distribution of colors in the histogram and the continuity of color distribution across the histogram, the color histogram analysis could likely classify the photograph in FIG. 5A as a natural image type and the graphically rendered image in FIG. 5B as a synthetic image type. It should be noted that the image types have been kept to just two types in FIGS. 5A-5D to simplify the illustration of color histogram analysis and that one of ordinary skill in the art would realize that the color histogram analysis could be applied to further classify images into image types such as color images, black-and-white images, gray images, color natural images, black-and-white natural images, gray natural images, simple graphics, complex graphics, gray graphics, etc.

Compression Distortion Analysis

The compression distortion analysis determines the image type of the content by utilizing the different degrees of distortion created for different images types when the content is compressed and decompressed using an encoder designed for a specific image type. The distortion is measured between the original content and the compressed and subsequently decompressed content.

The compression distortion analysis utilizes the high degree of distortion (a compression artifact) suffered by synthetic images, compared to natural images, when the synthetic images are compressed and decompressed using a natural image encoder-decoder to distinguish synthetic images from natural images. A compression artifact is a noticeable distortion of content (including images, audio, and video) caused by the application of lossy data compression such as JPEG compression algorithm. Lossy data compression involves discarding some of the content's data so that it becomes simplified enough to be stored within the desired disk space (known as a data rate or bit rate for media that is streamed). If the decompression could not reproduce enough data from the compressed version to reproduce the original, the result is a diminishing of quality, or introduction of artifacts in the decompressed image.

When a given image is compressed using JPEG compression algorithm, the image needs to be subsequently decompressed using a JPEG decoder to reproduce an image similar to the original image that was compressed using JPEG compression algorithm. The decoding process reverses the encoding steps that were performed during compression, except a quantization process that was performed during compression.

Quantization:

The human eye is good at seeing small differences in brightness over a relatively large area, but not so good at distinguishing the exact strength of a high frequency brightness variation. This allows one to greatly reduce the amount of information in the high frequency components and reduce the size of the image. This is done by simply dividing each component in the frequency domain by a constant for that component, and then rounding to the nearest integer. This rounding operation is a lossy operation. As a result of this lossy operation, it is typically the case that many of the higher frequency components are rounded to zero, and many of the rest become small positive or negative numbers, which take many fewer bits to represent.

The compression artifacts that appear in JPEG images may take the form of noise around contrasting edges (especially curves and corners), or blocky images, commonly known as 'jaggies'. As explained above, these artifacts are due to the quantization step of the JPEG algorithm. They are especially noticeable around sharp corners between contrasting colors (text is a good example as it contains many such corners).

Figure 6A:
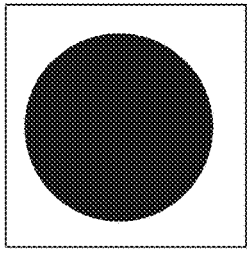
FIG. 6A is an illustration of the effect of compression induced artifacts in images.

Further, synthetic images created using ray-tracing programs have noticeable blocky shapes on the terrain. Also, certain low-intensity compression artifacts that might be acceptable when simply viewing the images, can be emphasized if the image is subsequently processed, showing increased distortion compared to the original image. FIG. 6A is an illustrative example of compression artifacts that appear in JPEG images in the form of noise around contrasting edges (especially curves and corners). When a lossless compression is used to compress and decompress a given image, the edge detector shows no artifacts around the curves. On the other hand, when the image is compressed and decompressed using a lossy compression, such as a JPEG compression algorithm, the edge detector detects a lot of artifacts around the curves of the lossy compressed image.

The JPEG compression algorithm, thus, is best suited for photographs and paintings of realistic scenes with smooth variations of tone and color. JPEG is also the most common format used by digital cameras to save photographs. On the other hand, JPEG compression algorithm may not be as well suited for line drawings and other synthetic images such as textual or iconic graphics, where the sharp contrasts between adjacent pixels can cause noticeable artifacts.

Utilizing the resulting distortion (i.e. artifacts), the compression distortion analysis can identify the image class of a given image content. Measuring distortion between two given images is well known in the art and any of the prior known processes could be used to used to measure the distortion. The compression distortion analysis could measure distortion between the original version and the processed version of the image using a Peak Signal-to-Noise Ratio (PSNR) index or a Structural Similarity (SSIM) index.

PSNR is the ratio between the maximum possible power of a signal and the power of corrupting noise that affects the fidelity of its representation. PSNR is usually expressed in terms of the logarithmic decibel scale. PSNR is most commonly used as a measure of quality (i.e. level of distortion) for the reconstructed images based on lossy compression such as JPEG compression. The signal in this case is the original data in the image to be compressed, and the noise is the error introduced by compression. A high PSNR normally indicates that the reconstructed image is of high quality and suffers little compression artifacts (i.e. distortion), while a low PSNR indicates that the reconstructed image is of low quality and suffers high compression artifacts (i.e. distortion).

The PSNR value can be defined via the mean squared error (MSE). MSE for two m×n monochrome images I and K where one of the images is considered a noisy approximation of the other is defined as:

$$MSE = \frac{1}{mn}\sum_{i=0}^{m-1}\sum_{j=0}^{n-1}[I(i,j) - K(i,j)]^2$$

The PSNR is define as:

$$PSNR = 10 \cdot \log_{10}\left(\frac{MAX_I^2}{MSE}\right)$$
$$= 20 \cdot \log_{10}\left(\frac{MAX_I}{\sqrt{MSE}}\right)$$
$$= 20 \cdot \log_{10}(MAX_I) - 10 \cdot \log_{10}(MSE)$$

Here, MAXI is the maximum possible pixel value of the image. When the pixels are represented using 8 bits per sample, this is 255. More generally, when samples are represented using linear PCM with B bits per sample, MAXI is 2B−1. For color images with three RGB values per pixel, the definition of PSNR is the same except the MSE is the sum over all squared value differences divided by image size and by three. Alternately, for color images the image is converted to a different color space and PSNR is reported against each channel of that color space, e.g., YCbCr or HSL.

In the compression distortion analysis, the natural images, such as photographs, will have high PSNR values (signifying low distortion) while synthetic images, such as graphical rendered images, will have low PSNR value (signifying high distortion). A threshold for PSNR value can be established to identify an image as synthetic when the processed image's PSNR value is lower than the established threshold and an image as natural when the processed image's PSNR value is greater than the established threshold. In one instance, the threshold can be empirically established by analyzing a large sample of natural and synthetic images and setting the threshold at the point that result in the least number of false-positives in the determination of image type.

Structural Similarity (SSIM) index is a method for measuring the degree of similarity between two images. The SSIM index is a full reference metric where the measuring of image quality is based on an initial uncompressed and distortion-free image as reference. SSIM is designed to improve on peak signal-to-noise ratio (PSNR) and mean squared error (MSE). The difference with respect to other techniques mentioned previously, such as MSE or PSNR, is that these approaches estimate perceived errors while SSIM on the other hand considers image degradation as perceived change in structural information. Structural information is the idea that the pixels have strong inter-dependencies especially when they are spatially close. These dependencies carry important information about the structure of the objects in the visual scene.

Figure 6B:
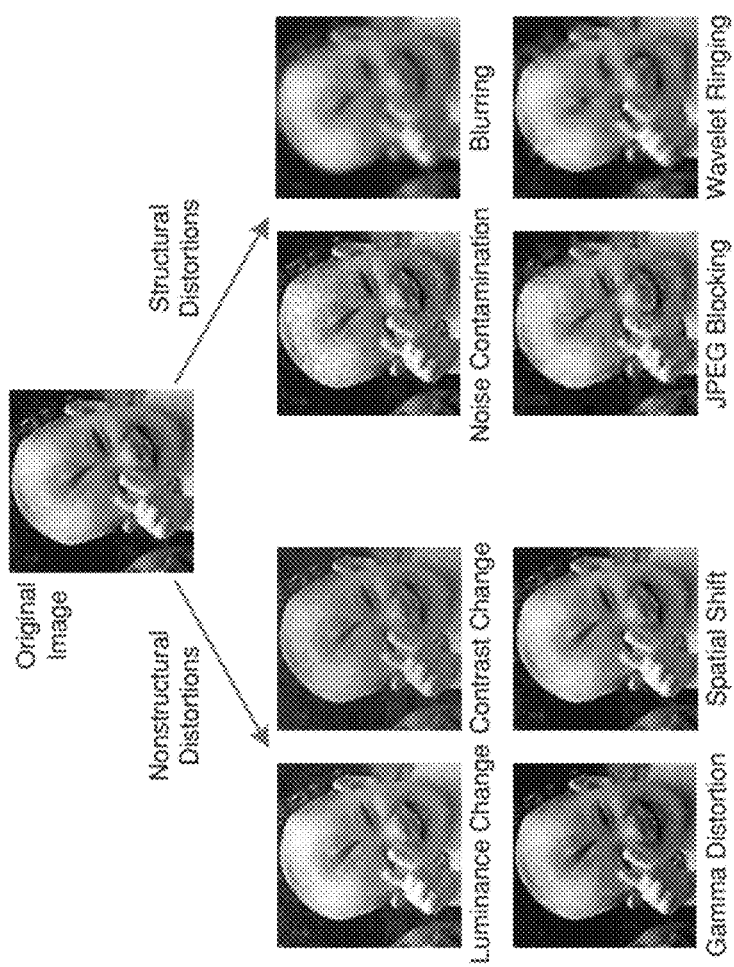
FIG. 6B is an illustration of measuring distortion between images based on structural dissimilarities in the images.

Under the SSIM approach, the human visual system is highly adapted to extract structural information from visual scenes. Therefore, at least for image quality measurement, the retention of signal structure in the processed image is an important ingredient. FIG. 6B helps illustrate the distinction between structural and nonstructural distortions. In the figure, the nonstructural distortions (a change of luminance or brightness, a change of contrast, Gamma distortion, and a spatial shift) are caused by ambient environmental or instrumental conditions occurring during image acquisition and display. These distortions do not change the structures of images of the objects in the visual scene. However, other distortions (additive noise and blur and lossy compression generated artifacts) significantly distort the structures of images of the objects.

The basic form of SSIM: Suppose that x and y are local image patches taken from the same location of the original image and the processed image. The local SS IM index measures the similarities of three elements of the image patches: the similarity l(x, y) of the local patch luminances (brightness values), the similarity c(x, y) of the local patch contrasts, and the similarity s(x, y) of the local patch structures. These local similarities are expressed using simple, easily computed statistics, and combined together to form local SSIM.

The SSIM metric is calculated on various windows of an image. The measure between two windows and of common size N×N is:

$$SSIM(x,y) = \frac{(2\mu_x\mu_y + c_1)(2\sigma_{xy} + c_2)}{(\mu_x^2 + \mu_y^2 + c_1)(\sigma_x^2 + \sigma_y^2 + c_2)}$$

where, μx and μy are (respectively) the local sample means of x and y, sx and sy are (respectively) the local sample standard deviations of x and y, and sxy is the sample cross correlation of x and y after removing their means. The items C1, C2, and C3 are small positive constants that stabilize each term, so that near-zero sample means, variances, or correlations do not lead to numerical instability. The SSIM index is symmetric: S(x, y)=S(y, x), so that two images being compared give the same index value regardless of their ordering. It is also bounded: −1<S(x, y)=1, achieving maximum value of S(x, y)=1 if and only if x=y (i.e. when the local image patches are structurally identical). The SSIM index is computed locally within a sliding window that moves pixel-by-pixel across the image, resulting in a SSIM map. The SSIM score of the entire image is then computed by pooling the SSIM map, e.g., by simply averaging the SSIM values across the image. More sophisticated adaptive space-variant weighting can also be used.

Referring back to FIG. 6A, the lossy compression, such as JPEG compression, introduces artifacts around structures such as curves in the processed synthetic images. In turn, in the compression distortion analysis, the synthetic images, such as graphical rendered images, will have low S(x, y) index value (signifying high distortion) while the natural images, such as photographs, will have high S(x, y) index values (signifying low distortion). A threshold for S(x, y) value can be established to identify an image as synthetic when the processed image's S(x, y) value is lower than the established threshold and an image as natural when the processed image's S(x, y) value is greater than the established threshold. In one instance, the threshold can be empirically established by analyzing a large sample of natural and synthetic images and setting the threshold at the point that result in the least number of false-positives in the determination of image type.

It should be noted that the image types have been kept to just two types in order to simplify the illustration of compression distortion analysis and that one of ordinary skill in the art would realize that the compression distortion analysis could be applied to further classify images into image types such as color images, black-and-white images, gray images, color natural images, black-and-white natural images, gray natural images, simple graphics, complex graphics, gray graphics, etc. by establishing multiple PSNR and S(x, y) threshold values to distinguish each of the additional image types.

Edge Detection Analysis

The content is further analyzed using the edge detection analysis to determine the image type of the content. The edge detection analysis utilizes the geometry of edges (e.g. a straight line edge) of various objects in the content to determine an image type for the received content, where certain geometry of edges are likely to be found only in certain image types over others.

Just like a shadow, an edge is not a physical entity. Traditionally, edges have been loosely defined as pixel intensity discontinuities within an image. In one instance, an edge can be defined as where the vertical and the horizontal surfaces of an object meet. In another instance, an edge can be defined the change in brightness between two objects. There are many methods for edge detection, but most of them can be grouped into two categories, search-based and zero-crossing based. The search-based methods detect edges by first computing a measure of edge strength, usually a first-order derivative expression such as the gradient magnitude, and then searching for local directional maxima of the gradient magnitude using a computed estimate of the local orientation of the edge, usually the gradient direction. The zero-crossing based methods search for zero crossings in a second-order derivative expression computed from the image in order to find edges, usually the zero-crossings of the Laplacian or the zero-crossings of a non-linear differential expression. As a pre-processing step to edge detection, a smoothing stage, typically Gaussian smoothing, is almost always applied.

Figure 7A:
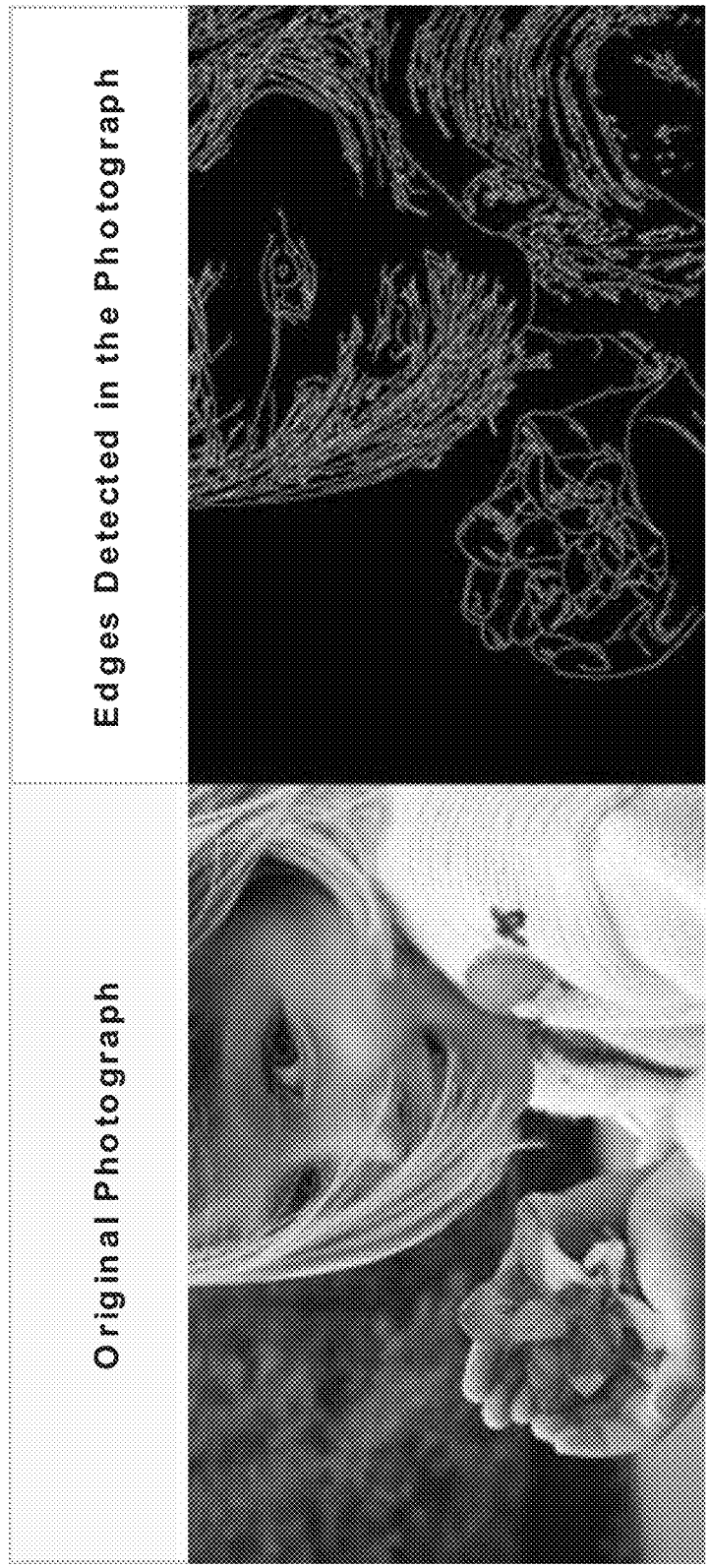
FIG. 7A is an illustration of the results of edge detection for a natural image.
Figure 7B:
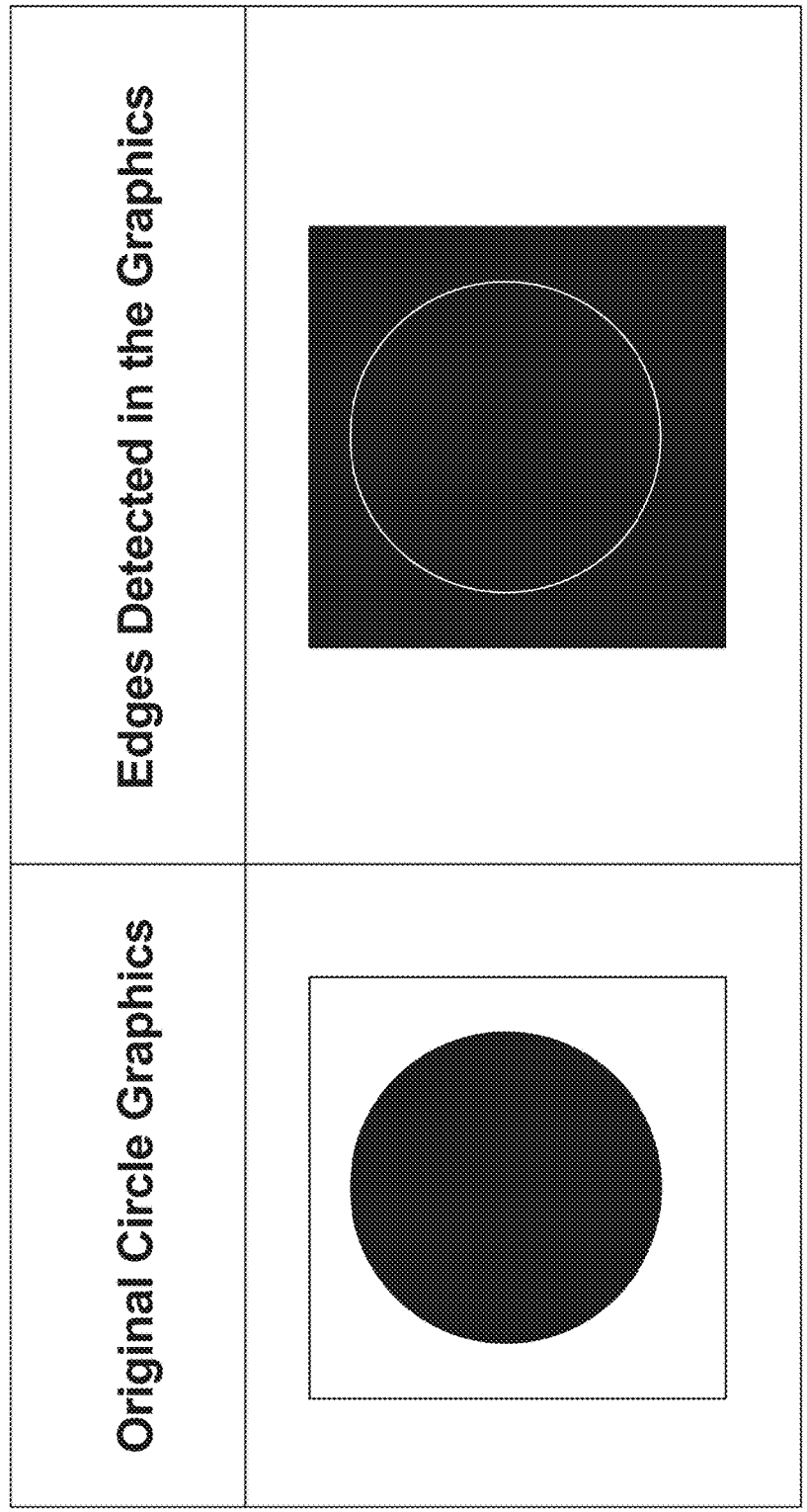
FIG. 7B is an illustration of the results of edge detection for a synthetic image.

FIGS. 7A and 7B show the edges that were detected in the natural photograph (FIG. 7A) and the graphically rendered image (FIG. 7B). As can be seen in the FIGS. 7A and 7B, natural images are less likely to contain edges that follow geometric shapes like straight lines, sharp corners, etc. symmetrical and are more likely to have edges that are randomly distributed. On the other hand, synthetic images contain edges that follow a greater degree of uniformity across the image and include edges that follow geometric shapes like straight lines, sharp corners, etc. By utilizing this distinction, the edge detection analysis could identify images into natural or synthetic image types based on the geometry and distribution of edges in a given content. Further, a threshold for identifying geometric shapes like straight lines can be established to identify an image as synthetic when the processed image, for instance, contains straight-line edges that are of certain minimum length and a 180 degree angle along the length of the edge. In one instance, the threshold can be empirically established by analyzing a large sample of natural and synthetic images and setting the threshold at the point that result in the least number of false-positives in the determination of image type.

It should be noted that the image types have been kept to just two types in order to simplify the illustration of edge detection analysis and that one of ordinary skill in the art would realize that the edge detection analysis could be applied to further classify images into image types such as color images, black-and-white images, gray images, color natural images, black-and-white natural images, gray natural images, simple graphics, complex graphics, gray graphics, etc. by establishing geometric shapes and their associated threshold values that are likely to be found in these additional image types.

Contiguous Pixel Analysis

The contiguous pixel analysis utilizes the presence of contiguous pixels of similar color in the received content to determine the content's image type, where such contiguous pixels are more likely to be found only in certain image types than others. Content such as digital images are composed of pixels, where each pixel indicates a variations of red, green, and blue at a particular location on a grid of pixels representing the digital image. The colors in a natural image, such as a photograph, are affected by the unique effect of lighting and other natural elements, such as dirt, causing the color of the pixels, even contiguous ones, in the image to vary by a measurable difference.

On the other hand, synthetic images, rendered graphically, are more likely to have pixels, especially the contiguous ones, to have colors that vary little from each other. Synthetic images can be anti-aliased to create the effect of lighting and other natural elements in the image, causing contiguous pixels to contain colors that are less likely to be similar. However, given that anti-aliasing and other techniques utilize mathematical principles to create the effect, the graphically rendered pixels in the synthetic image are still likely to contain a greater number of contiguous pixels of similar colors than a natural image.

The color of a given pixel can be defined using a RGB colorspace, a HSV colorspace, or any well known standard colorspace. The RGB colorspace is a commonly used colorspace scheme. For example, most color monitors operate on RGB inputs. In RGB colorspace, each color is represented by a three number 'triple'. The components of this triple specify, respectively, the amount of red, the amount of green, and the amount of blue in the color. In most computer graphics systems (and in xv), these values are represented as 8-bit unsigned numbers. Thus, each component has a range of 0-255, inclusive, with 0 meaning 'no output', and 255 meaning 'full output'.

The eight 'primary' colors in the RGB colorspace, and their values in the standard 8-bit unsigned range are:

TABLE 3

| COLOR | (R, G, B) |
| --- | --- |
| Black | (0, 0, 0) |
| Red | (255, 0, 0) |
| Green | (0, 255, 0) |
| Yellow | (255, 255, 0) |
| Blue | (0, 0, 255) |
| Magenta | (255, 0, 255) |

TABLE 3-continued

| COLOR | (R, G, B) |
|---|---|
| Cyan | (0, 255, 255) |
| White | (255, 255, 255) |

Other colors are specified by intermediate values. For example, orange is chromatically between red and yellow on the color spectrum. To get an orange, one can simply average red (255,0,0) and yellow (255,255,0) on a component-by-component basis resulting in (255,127,0), which will be an orange-ish color. Also, the brightness of the colors can be changed by raising or lowering all of their components by some factor. For example, if (0,255,255) is cyan (it is), then (0,128,128) would be a dark cyan.

In the HSV colorspace, each color is again determined by a three-component 'triple'. The first component, Hue, describes the basic color in terms of its angular position on a 'color wheel'. In this particular implementation, Hue is described in terms of degrees. The 'primary' colors live, in degrees, is shown in Table 4.

TABLE 4

| COLOR | Hue Value |
|---|---|
| Red | 0 |
| Yellow | 60 |
| Green | 120 |
| Cyan | 180 |
| Blue | 240 |
| Magenta | 300 |

As with the RGB space, in-between colors are represented by in-between values. For example, orange would have a Hue value of 30, being situated roughly halfway between red and yellow.

The second component of the HSV triple is Saturation, which can be thought of as "how pure the color is". In this implementation, saturation can range between 0 and 100, inclusive. Colors with a saturation of 100 are fully-saturated, whereas colors with a saturation of 0 are completely desaturated (in other words, grey).

The third component of the HSV triple is Value, which really should be called Intensity. It is a measure of how 'bright' the color is. In this implementation, Value can range between 0 and 100, inclusive. A color with a Value component of 100 will be as bright as possible, and a color with a Value component of 0 will be as dark as possible (i.e., black).

Figure 8A:
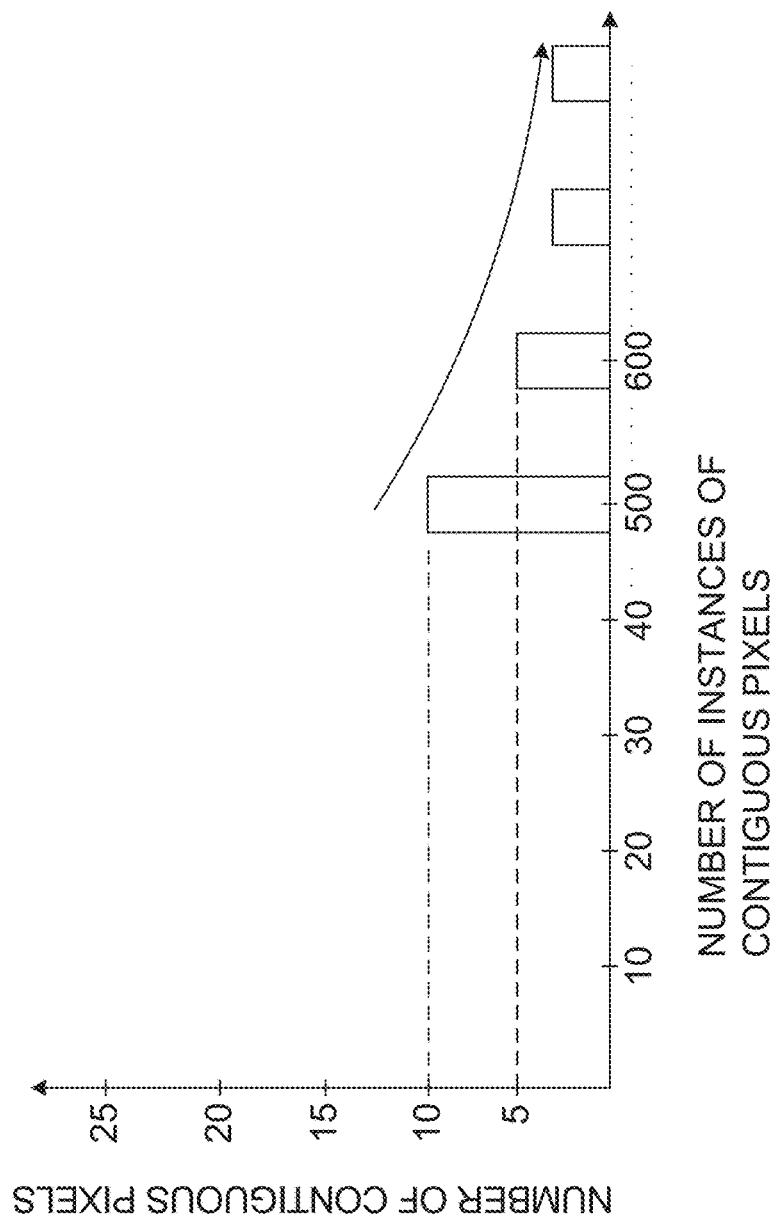
FIG. 8A is an illustration of the contiguous pixel analysis for the natural image shown in FIG. 5A.
Figure 8B:
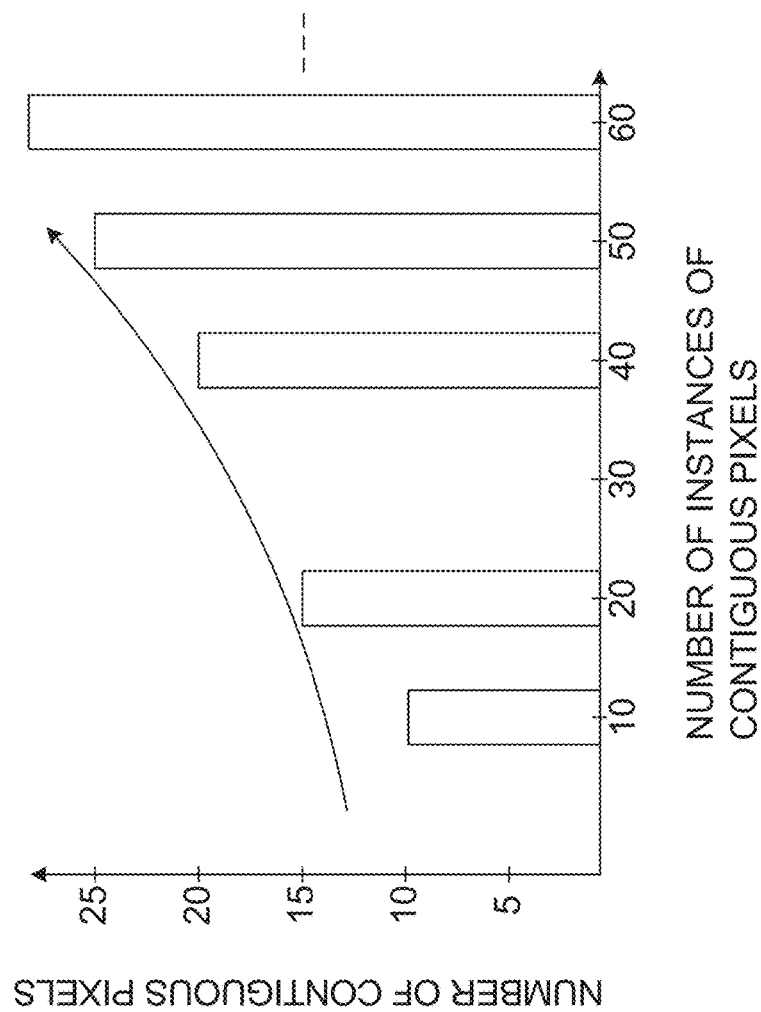
FIG. 8B is an illustration of the contiguous pixel analysis for the synthetic image shown in FIG. 5B.

FIGS. 5A, 5B, 8A and 8B illustrate the contiguous pixel analysis, where the natural image in FIG. 5A and synthetic image in FIG. 5B are given their respective contiguous pixel distribution in FIGS. 8A and 8B. The contiguous pixel analysis first establishes a set of contiguous pixels as having similar colors when the colors have HSV value (or RGB value or any equivalent mathematical representation of a color space) that differ by less than a given threshold value. The threshold can be set for each component of the HSV value or the threshold could be the average change across all components of the HSV value. As shown in FIGS. 8A and 8B, the contiguous pixel analysis then groups these various contiguous pixels by the number of contiguous pixels in a given group and determines the number of instances of each group containing a given number of contiguous pixels. When the number of instances of each group containing a given number of contiguous pixels in the content is above a second established threshold, the content is classified as a synthetic image. On the other hand, when the number of instances of each group containing a given number of contiguous pixels in the content is below a second established threshold, the content is classified as a natural image. For example, in FIG. 8A, as expected, the natural image had few instances of contiguous pixels of similar color, with most of the groups of contiguous pixels consisting of 10 or less pixels. On the other hand, in FIG. 8B, the synthetic image had a greater number of instances of contiguous pixels of similar color, with most of the groups of contiguous pixels consisting of 10 or more pixels. The contiguous pixel analysis, by determining this distinction in occurrence of contiguous pixels in different image types, will determine FIG. 8A to be a natural image and FIG. 8B to be a synthetic image. Further, in one instance, the various thresholds used in the contiguous pixel analysis can be empirically established by analyzing a large sample of natural and synthetic images and setting the threshold at the point that result in the least number of false-positives in the determination of image type.

It should be noted that the image types have been kept to just two types in order to simplify the illustration of contiguous pixel analysis and that one of ordinary skill in the art would realize that the contiguous pixel analysis could be applied to further classify images into image types such as color images, black-and-white images, gray images, color natural images, black-and-white natural images, gray natural images, simple graphics, complex graphics, gray graphics, etc. by establishing threshold values for occurrence of contiguous pixels that are likely to be found in these additional image types.

Transcoding

The following sections provide further description of the transcoding process used to convert the received image into one or more image adaptations. The multimedia content server 114 transcodes the content using a set of transcoding parameters that are specific to the content's image type and any associated constraints in delivery and display, processing and storage of the requested content at the client's devices. When transcoding, the transcoding process utilizes a set of transcoding parameters that help manipulating the images along the dimensions of image size, fidelity, color, etc. For one, the transcoding can reduce the size of the images in order to fit the images onto the client display screens. Further, transcoding can reduce the amount of data needed to represent the images and speed up download times. The transcoding process can also change the storage format of the image in order to gain compatibility with the client device image handling methods.

Some example transcoding functions include image size reduction, fidelity of image, color content switching of image, etc. In image size reduction, the image can be reduced, cropped, and sub-sampled. For example the full-resolution 256×256 image can be spatially reduced to generate a smaller 192×192 image. In image fidelity changes, the image is compressed using algorithms such as JPEG and GIF compress, quantized, resolution reduced, edges enhanced, contrast stretched, histogram equalized, gamma corrected, smoothed, sharpened, and de-noised. For example the full-resolution image can be compressed in addition to being spatially reduced to further reduce the amount of data in the image. Color content changes to the image include color reduction, mapping to color table, converting to gray, converting to black-and-white image, thresholding, and dithering. For example, the full-resolution image can undergo color reduction to generate an 8-bit RGB color image with only 256 colors. The image can undergo further color reduction to generate a 4-bit gray image with only 16 levels of gray. The image can undergo even further color reduction to generate a 1-bit black-and-white image. The color reduction can further involve dithering to optimize the photograph quality in black-and-white.

Further, as many client devices are constrained in their capabilities, they cannot simply access image content as-is on the network. For example, many smart phones cannot easily display Web pages loaded with images because of screen size limitations. Also, the presence of fully saturated red or white images causes distortion on TV-based Web browser displays. Other constraints of the client devices such as the nature of the network connectivity can be consider. For example, devices such as hand-held computers, smart phones, etc. that use wireless links may suffer from intermittent connectivity. In these cases, the transcoding process can also consider adding redundancy to the data to protect against data loss.

In general, the transcoding process allows the multimedia content server 114 to publish content at the highest fidelity, where the server 114 manipulates the content to adapt to the unique characteristics of the client device requesting the content. The transcoding process can derive the appropriate values for transcoding parameters such as dimensions of transcoded image size, fidelity of the transcoded image, color space of the transcoded image, etc. based upon image type of the content and requesting client device's capabilities. For example, in one instance, when the content is a synthetic image, the transcoding parameters for sizing should be set such that no resizing of synthetic images is performed. Similarly, for synthetic images, the transcoding parameters for image compression should be set to GIF compression. These transcoding parameters for synthetic images can be further modified based on the requesting client device's capabilities. When the requesting client device's display screen is known, the transcoding parameters for sizing of the synthetic image should be set close to that of the client device's display screen. Similar transcoding parameters that provide the best client experience can be set for natural images.

FIG. 9 is a high-level block diagram showing an example of the architecture for a computer system 900 that can be utilized to implement a multimedia content analysis server (e.g., 114 from FIG. 1), a web server (e.g., 125 from FIG. 1), etc. In FIG. 9, the computer system 900 includes one or more processors 905 and memory 910 connected via an interconnect 925. The interconnect 925 is an abstraction that represents any one or more separate physical buses, point to point connections, or both connected by appropriate bridges, adapters, or controllers. The interconnect 925, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 694 bus, sometimes referred to as "Firewire".

The processor(s) 905 may include central processing units (CPUs) to control the overall operation of, for example, the host computer. In certain embodiments, the processor(s) 905 accomplish this by executing software or firmware stored in memory 910. The processor(s) 905 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 910 is or includes the main memory of the computer system. The memory 910 represents any form of random access memory (RAM), read-only memory (ROM), flash memory (as discussed above), or the like, or a combination of such devices. In use, the memory 910 may contain, among other things, a set of machine instructions which, when executed by processor 905, causes the processor 905 to perform operations to implement embodiments of the present invention.

Also connected to the processor(s) 905 through the interconnect 925 is a network adapter 915. The network adapter 915 provides the computer system 900 with the ability to communicate with remote devices, such as the storage clients, and/or other storage servers, and may be, for example, an Ethernet adapter or Fiber Channel adapter.

Unless the context clearly requires otherwise, throughout the description and the claims, the words "comprise," "comprising," and the like are to be construed in an inclusive sense (i.e., to say, in the sense of "including, but not limited to"), as opposed to an exclusive or exhaustive sense. As used herein, the terms "connected," "coupled," or any variant thereof means any connection or coupling, either direct or indirect, between two or more elements. Such a coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. While processes or blocks are presented in a given order in this application, alternative implementations may perform routines having steps performed in a different order, or employ systems having blocks in a different order. Some processes or blocks may be deleted, moved, added, subdivided, combined, and/or modified to provide alternative or sub-combinations. Also, while processes or blocks are at times shown as being performed in series, these processes or blocks may instead be performed or implemented in parallel, or may be performed at different times. Further any specific numbers noted herein are only examples. It is understood that alternative implementations may employ differing values or ranges.

The various illustrations and teachings provided herein can also be applied to systems other than the system described above. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, and concepts included in such references to provide further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims. While certain aspects of the invention are presented below in certain claim forms, the applicant contemplates the various aspects of the invention in any number of claim forms. For example, while only one aspect of the invention is recited as a means-plus-function claim under 35 U.S.C. § 112, sixth paragraph, other aspects may likewise be embodied as a means-plus-function claim, or in other forms, such as being embodied in a computer-readable medium. (Any claims intended to be treated under 35 U.S.C. § 112, ¶6 will begin with the words "means for.") Accordingly, the applicant reserves the right to add additional claims after filing the application to pursue such additional claim forms for other aspects of the invention.

What is claimed is:

1. A method comprising:
receiving an image;
analyzing, using a processor of a computer system, the received image to produce analyzing results;
assigning, based on the analyzing results, an image type to the received image;
identifying a plurality of transcoding parameters, wherein at least one of the transcoding parameters is selected based on the assigned image type; and
transcoding the received image using the plurality of transcoding parameters.

2. The method of claim 1, wherein analyzing the received image comprises compression distortion analysis, wherein the compression distortion analysis includes analysis of distortion between the received image and a processed version of the received image.

3. The method of claim 2, wherein the analysis of distortion between the received image and the processed version of the received image is performed using one or more of:
a Peak Signal-to-Noise Ratio (PSNR) index; or
a structural similarity (SSIM) index.

4. The method of claim 2, further comprising:
identifying that the image type is a synthetic image type if the distortion is greater than a specified threshold; and
identifying that the image type is a natural image type if the distortion is less than the specified threshold.

5. The method of claim 1, wherein analyzing the received image comprises contiguous pixels analysis, wherein the contiguous pixels analysis includes computing whether a number of pixel groups from the received image is above a color continuity threshold, wherein the color continuity threshold corresponds to a distinction in image types.

6. The method of claim 5, wherein the contiguous pixels analysis comprises identifying that a first pixel of the contiguous pixels and a second pixel of the contiguous pixels are of similar color when one or more of a hue value or a saturation value associated with the first pixel and the second pixel are within a specified threshold level of each other.

7. The method of claim 1, wherein analyzing the received image comprises an analysis of edges detected in the received image.

8. The method of claim 1, wherein transcoding the received image comprises converting the image from one format to another format based on whether the image type is a synthetic image type.

9. A non-transitory computer-readable storage medium storing instructions that, when executed by at least one processor, cause a computing device to:
receive an image;
analyze the received image to produce analyzing results;
assign, based on the analyzing results, an image type to the received image;
identify a plurality of transcoding parameters, wherein at least one of the transcoding parameters is selected based on the assigned image type; and
transcode the received image using the plurality of transcoding parameters.

10. The non-transitory computer-readable storage medium of claim 9, wherein the instructions, when executed by the at least one processor, cause the computing device to transcode the received image by converting the image from one format to another based on whether the image type is a synthetic image type.

11. The non-transitory computer-readable storage medium of claim 9,
wherein the instructions, when executed by the at least one processor, cause the computing device to assign the image type by assigning a natural image type; and
further comprising instructions that, when executed by the at least one processor, cause the computing device to determine, based on the natural image type being assigned to the received image, to run facial recognition on the received image.

12. The non-transitory computer-readable storage medium of claim 9,
wherein the instructions, when executed by the at least one processor, cause the computing device to assign the image type by assigning a natural image type; and
further comprising instructions that, when executed by the at least one processor, cause the computing device to select, based on the natural image type being assigned to the received image, a set of photo editing tools to provide to a user that correspond to natural images.

13. The non-transitory computer-readable storage medium of claim 12, wherein the set of photo editing tools comprises a red eye reduction tool.

14. The non-transitory computer-readable storage medium of claim 9, wherein the image type corresponds to one or more of a color image or a black-and-white image.

15. The non-transitory computer-readable storage medium of claim 9, wherein the instructions, when executed by the at least one processor, cause the computing device to transcode the received image by adding redundancy to protect against data loss.

16. The non-transitory computer-readable storage medium of claim 9, wherein the instructions, when executed by the at least one processor, cause the computing device to:

assign the image type by assigning a natural image type; and transcode the received image by converting, based on the natural image type being assigned to the received image, the received image into a GIF compression format.

17. The non-transitory computer-readable storage medium of claim 9, wherein the instructions, when executed by the at least one processor, cause the computing device to:

assign the image type by assigning a synthetic image type; and transcode the received image by setting, based on the synthetic image type being assigned to the received image, a parameter indicating that no resizing of the received image should be performed.

18. A system comprising:

one or more processors;

an interface configured to receive an image; and a non-transitory computer readable storage medium comprising instructions that, when executed by the one or more processors, cause the system to:

analyze the received image to produce analyzing results;

assign, based on the analyzing results, an image type to the received image;

identify a plurality of transcoding parameters, wherein at least one of the transcoding parameters is selected based on the assigned image type; and transcode the received image using the plurality of transcoding parameters.

19. The system of claim 18 further comprising instructions that, when executed by the one or more processors, cause the system to identify a transcoding process to apply to the received image by one or more of:

identifying whether a compression is to be applied to the received image based on the image type assigned to the received image;

identifying a type of compression to be applied to the received image based on the image type assigned to the received image;

identifying one or more of a type or intensity of size reduction to be applied to the received image based on the image type assigned to the received image;

identifying one or more of a type or intensity of color reduction to be applied to the received image based on the image type assigned to the received image; or any combination thereof.

20. The system of claim 18, wherein:

the image type is a natural image type; and the received image is one or more of:

a photograph;

a digital version of a photograph, wherein the digital version is generated by scanning;

a camera-produced image; or any combination thereof.

* * * * *